US010922500B2

(12) United States Patent
Horchak et al.

(10) Patent No.: US 10,922,500 B2
(45) Date of Patent: Feb. 16, 2021

(54) HANDHELD DYNAMIC RADIO FREQUENCY IDENTIFICATION DEVICE AND SYSTEM

(71) Applicant: Z Tech, Inc., Chicago, IL (US)

(72) Inventors: Cody A. Horchak, Chicago, IL (US); Frank Annerino, Palatine, IL (US)

(73) Assignee: Z Tech, Inc., Chicago, IL (US)

( * ) Notice: Subject to any disclaimer, the term of this patent is extended or adjusted under 35 U.S.C. 154(b) by 0 days.

(21) Appl. No.: 16/438,109

(22) Filed: Jun. 11, 2019

(65) Prior Publication Data

US 2019/0377914 A1 Dec. 12, 2019

Related U.S. Application Data

(60) Provisional application No. 62/760,722, filed on Nov. 13, 2018, provisional application No. 62/763,126, filed on Jun. 11, 2018.

(51) Int. Cl.
*G06K 7/10* (2006.01)

(52) U.S. Cl.
CPC ..... *G06K 7/10138* (2013.01); *G06K 7/10386* (2013.01)

(58) Field of Classification Search
None
See application file for complete search history.

(56) References Cited

U.S. PATENT DOCUMENTS

| 7,689,195 B2 | 3/2010 | Wu et al. |
| 9,959,440 B2 * | 5/2018 | Chau ............... H04B 5/0062 |
| 2015/0136857 A1 | 5/2015 | Pillin et al. |

OTHER PUBLICATIONS

ChameleonMini Rev. G With Enclosure—Rysc Corp., https://store.ryscc.com/collections/all/products/cmini-revg. Pulled from internet on Sep. 10, 2019.
Consolecowboys: Hacking Everything with RF and Software Defined Radio—Part 1, console-cowboys.blogspot.com/2017/10/hacking-everything-with-rf-and-software.html. Pulled from internet on Sep. 10, 2019.
The Fundamentals of Backscatter Radio and RFID Systems, Part II. Disney Research, Pittsburgh, 2009.
Hardware Description—Proxmark/proxmark3 Wiki—GitHub, https://github.com/Proxmark/proxmark3/wiki/Hardware-Description. Pulled from internet on Sep. 10, 2019.
Home—emsec/ChameleonMini Wiki Git Hub, https://github.com/emsec/ChameleonMini/wiki. Pulled from internet on Sep. 10, 2019.
Home—Proxmark/proxmark3 Wiki Git Hub, https://github.com/Proxmark/proxmark3/wiki. Pulled from internet on Sep. 10, 2019.

(Continued)

*Primary Examiner* — Daniell L Negron
(74) *Attorney, Agent, or Firm* — McAndrews, Held & Malloy, Ltd.

(57) ABSTRACT

A universal radio frequency identification reader and emulation handheld device and system configured to read and emulate radio frequency identification tags in the low frequency, high frequency, and ultra-high frequency spectrums (from 30 kHz to 1050 MHz). The system may include a mobile or a web application to control and interact with the handheld device. The system may allow for the saving of radio frequency identification tag information in cloud infrastructure for later emulation.

20 Claims, 18 Drawing Sheets

(56) References Cited

OTHER PUBLICATIONS

Joshua Griffin et al., Link Envelope Correlation in the Backscatter Channel. IEEE Communications Letters, vol. 11, No. 9, pp. 735-737. Sep. 2007.
Project Information General Overview, ComThings/PandwaRF Wiki Git Hub, https://github.com/ComThings/PandwaRF/wiki/Project-Information-General-Overview. Pulled from internet on Sep. 10, 2019.
Home ComThings/PandwaRF Wiki Git Hub, https://github.com/ComThings/PandwaRF/wiki. Pulled from internet on Sep. 10, 2019.
Proxmark—radio frequency identification tool Proxmark3 enables sniffing, reading and cloning of RFID tags, www.proxmark.org/?proxmark. Pulled from internet on Sep. 10, 2019.
Proxmark3 Kit—Rysc Corp., https://store.ryscc.com/products/new-proxmark3-kit. Pulled from internet on Sep. 10, 2019.
YARD Stick One—Rysc Corp., https://store.ryscc.com/collections/all/products/yard-stick-one. Pulled from internet on Sep. 10, 2019.
YARD Stick One greatscottgadgets/yardstick Wiki Git Hub, https://github.com/greatscottgadgets/yardstick/wiki/YARD-Stick-One. Pulled from internet on Sep. 10, 2019.

* cited by examiner

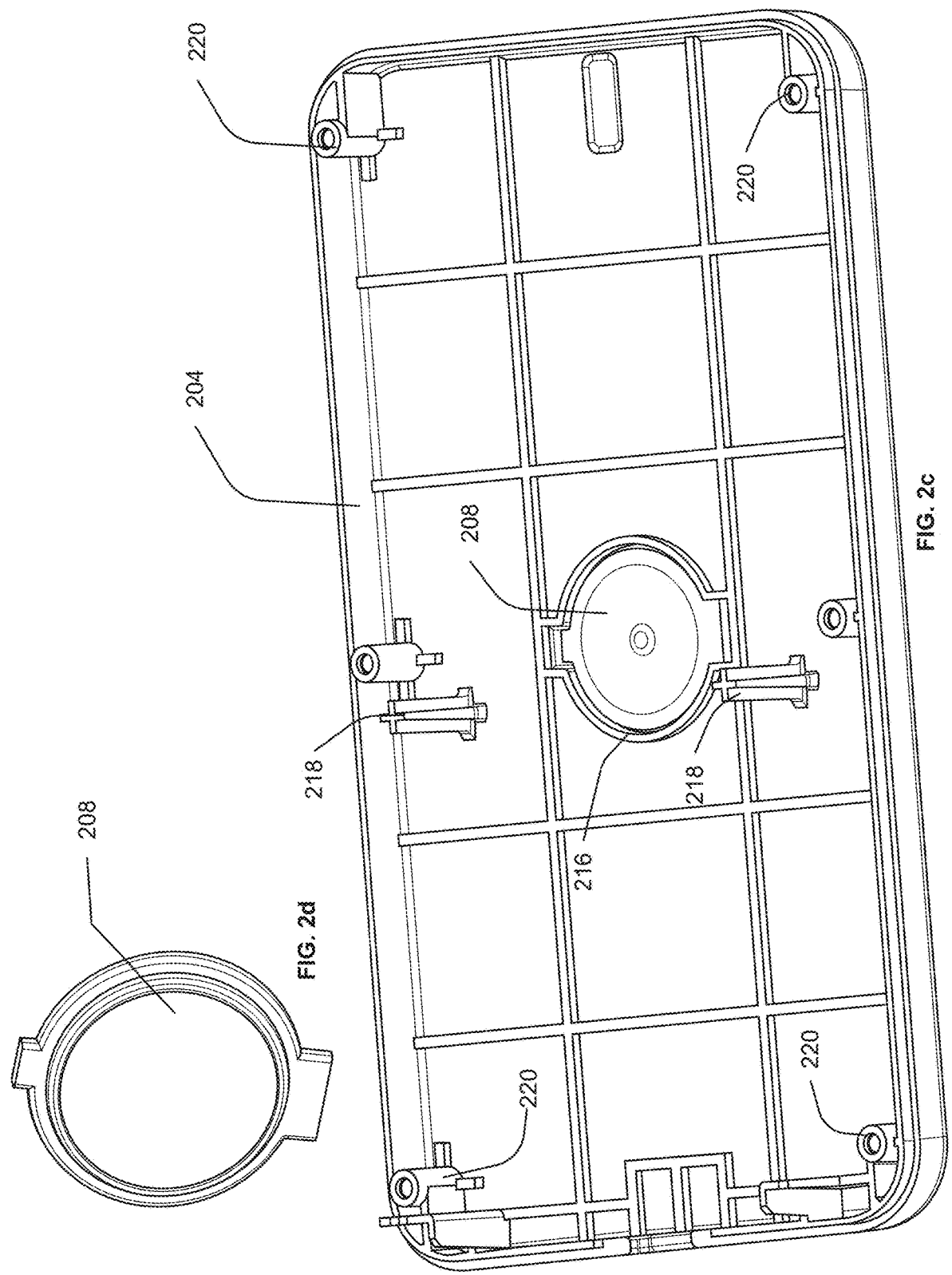

HANDHELD DYNAMIC RADIO FREQUENCY IDENTIFICATION DEVICE AND SYSTEM

PRIORITY CLAIM

This application claims priority to the following application(s), each of which is hereby incorporated by reference: U.S. provisional patent application 62/763,126 titled "RF EMULATOR SYSTEM" filed on Jun. 11, 2018; U.S. provisional patent application 62/760,722 titled "Handheld Dynamic Radio Frequency Identification Device and System" filed on Nov. 13, 2018.

BACKGROUND

The present disclosure relates to handheld radio frequency identification readers and emulators and systems for controlling and using the disclosed handheld radio frequency identification readers and emulators.

Radio frequency identification ("RFID") has become increasingly ubiquitous in all industries. RFID devices may use various operating frequencies, for example low frequency, high frequency, and ultra-high frequency. Further, various manufacturers of radio frequency identification devices may use various communication protocols. Presently, multiple different RFID readers may be required to read RFID tags that use the various operating frequencies and communication protocols. Further, various RFID tags may be required for different purposes to operate with various RFID readers. Accordingly the present disclosure relates to a device and system that may read and emulate various RFID devices, and novel uses therefor.

SUMMARY OF THE INVENTION

The present disclosure relates to universal handheld radio frequency identification readers and emulators as well as systems for controlling and using the disclosed handheld RFID readers and emulators, as illustrated by and described in connection with at least one of the figures, as set forth more completely in the claims.

No known devices currently exist that may read low frequency, high frequency, and ultra-high frequency RFID tags, and/or emulate low frequency, high frequency, and ultra-high frequency RFID tags in a single handheld device.

BRIEF DESCRIPTION OF THE DRAWINGS

FIG. 2c is an illustration of a view of an example interior of a casing of a handheld radio frequency identification reader and emulator.

FIG. 2d is an illustration of an example control button of an example handheld radio frequency identification reader and emulator.

The figures are not necessarily to scale. Where appropriate, similar or identical reference numbers are used to refer to similar or identical components.

DETAILED DESCRIPTION

The present disclosure relates to a handheld radio frequency identification ("RFID") device that may read and/or emulate RFID devices of various operating frequencies and communication protocols (i.e., a universal RFID device). The handheld radio frequency identification device may read and/or emulate one or multiple frequencies ranges of radio frequency. RFID devices are commonly used in various fields and application. For example, radio frequency identification devices may be used in access cards/keys/fobs in the hotel industry, commercial and residential buildings, offices, private residences, private clubs, gyms, or public transportation. RFID devices may also be used to access parking garages and parking lots. RFID devices may also be used in highway toll passes. RFID devices may also be used to track inventory. RFID devices may also be used in payments systems. For example RFID devices may be used in credit cards. The uses and applications of RFID devices are constantly expanding. RFID refers to radio frequency as it pertains to identification, but the term RFID typically includes three standard frequencies. Furthermore, various RFID devices may operate in various frequency bands. For example, low frequency ("LF") RFID devices typically operate between 30 kHz and 150 kHz, and more specifically between 125 kHz and 134 kHz. High frequency ("HF") RFID devices, including Near-Field communication ("NFC") typically operate at approximately 13.56 MHz, and ultra-high frequency ("UHF") RFID devices typically operate at 858 MHz to 930 MHz. Although LF, HF, and UHF are the standard frequencies within RFID, there are many frequencies in between the LF and UHF frequencies, as well as slightly below LF and slightly above UHF, and there are use cases around those additional frequencies that add to identification. For example, radio frequency is used in car keys, garage door openers, alarm remotes, remote lighting, push-to-start proximity car keys, wireless chimes, and wireless sensors. Most of these devices operate using radio frequency including in the ranges or in between, but all generally under 1 GHz (1000 MHz). Different manufacturers may use different communication protocols and data formats. Accordingly, operators may need to carry multiple RFID devices for various applications. Therefore, a device that may emulate various RFID devices in a single compact device is desirable.

Figure 1:
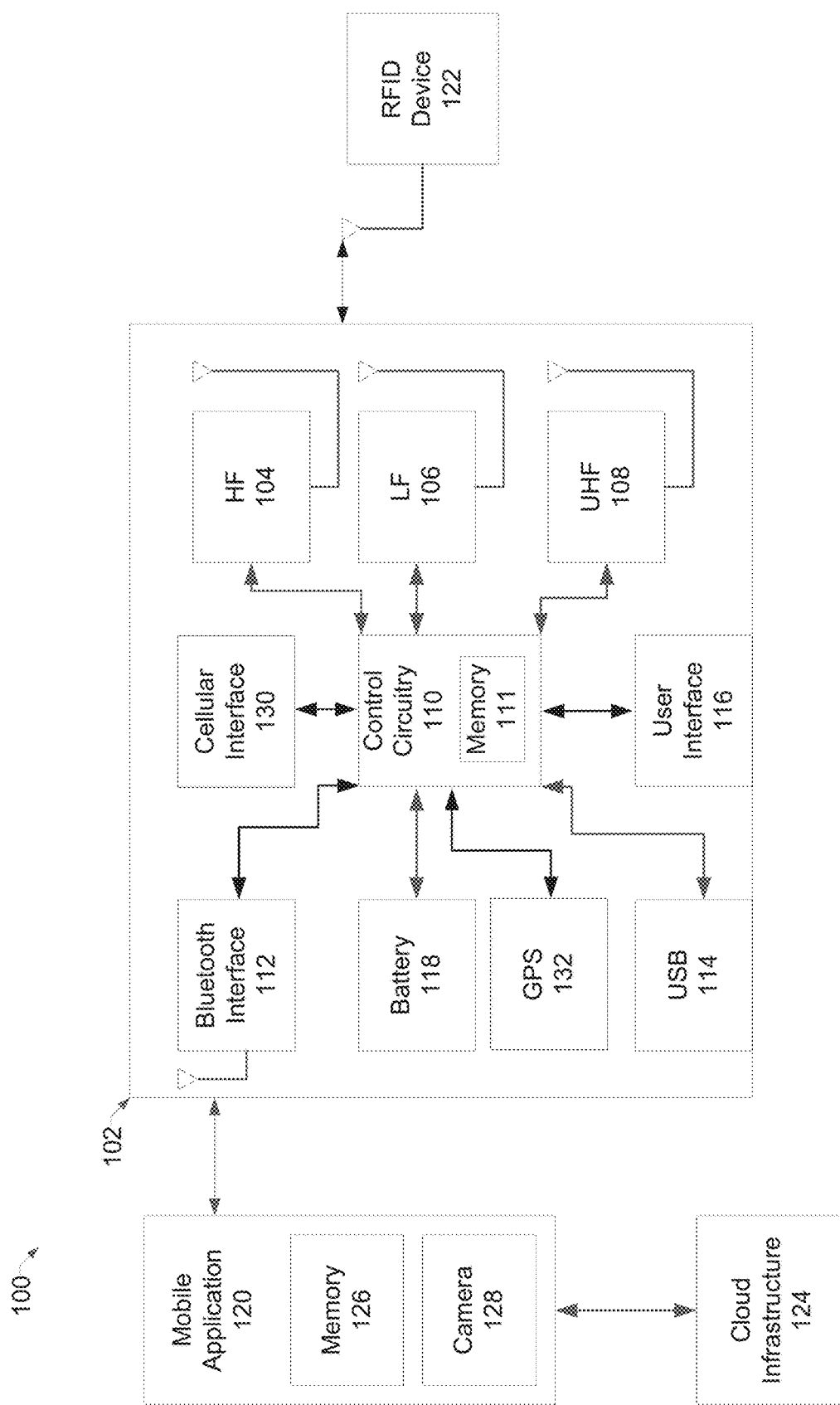
FIG. 1 is a block diagram of an example radio frequency identification reader and emulator system.

FIG. 1 illustrates a block diagram of an example radio frequency identification emulation system 100. The system 100 includes a handheld dynamic radio frequency identification tag device ("HDT") 102, which includes HF circuitry 104 including an HF antenna, LF circuitry 106 including an LF antenna, and UHF circuitry 108 including a UHF antenna. Each of the HF circuitry 104, the LF circuitry 106, and the UHF circuitry 108 are connected to control circuitry 110. The HDT 102 may include circuitry (i.e., control circuitry 110 and UHF circuitry 108, or a chip that includes control circuitry 110 and UHF circuitry 108) that is able to communicate with frequencies ranging from 142 MHz to 1050 MHz. With certain configurations of antennas, the HDT 102 would be able to communicate with all radio frequencies below 1050 MHz by modifying the antenna(s). In some examples, the control circuitry 110 includes memory 111.

The example HDT 102 also includes a Bluetooth interface 112 (e.g., a Bluetooth Low energy interface support Generic Attributes ("GATT") services), a universal serial bus ("USB") interface 114, a user interface 116, and a battery 118. The Bluetooth interface 112 may be used to communicate with an application (i.e., a mobile application) 120 running on a smartphone, tablet computer, or other computing device. Although described as a Bluetooth interface, any suitable wireless communications circuitry may be used to communicate with the mobile application 120. In some examples, the USB interface 114 may also be used to communicate with an application 120 running on a smartphone, tablet computer, or other computing device. The user interface 116 may include a button and an indicator light. The HDT 102 may be powered by the battery 118. In some examples, the battery 118 may be charged via charging power received at the USB interface 114, in some examples, the battery 118 may be inductively charged.

The example HDT 102 may be capable of LF, HF, and UHF radio frequency identification ("RFID") emulation. Accordingly, the HDT 102 may emulate an RFID signal that may be read by an RFID device 122, such as an RFID reader. The example HDT 102 may be compatible with HF, LF, and UHF RFID readers. The HDT 102 may also read an RFID device (i.e. read the data stored in an RFID tag).

An operator may control the HDT 102 via the mobile application 120. For example, and as explained in more detail below, an operator may command the HDT 102 to emulate a specific RFID tag via the mobile application 120. The RFID tag information, (which may include the tag identification serial number and tag type) is then communicated to the HDT 102 via the Bluetooth interface 112 (or via the USB interface 114). The control circuitry 110 then selects the appropriate circuitry with which to emulate the tag (the HF circuitry 104, LF circuitry 106, or UHF circuitry 108) based on the tag type. The tag information is transmitted via the corresponding antenna(s) (one of HF antenna, UHF antenna, LF antenna, or combination of the two of more antennas) to the RFID reader 122, thereby emulating the RFID tag.

In some examples, the control circuitry 110 includes a processor and a field-programmable gate array "FPGA"). The processor may communicate with the Bluetooth interface 112 and communicate with and configure the FPGA. In some examples, the Bluetooth interface might be part of the processor. In some examples, the FPGA may also replace the processor. In such cases, the FPGA may also communicate directly with the Bluetooth interface 112. In some examples, a processor may also replace the FPGA. In some examples, a single processor might consolidate the processor, FPGA and Bluetooth interface.

The FPGA may be used to modulate and demodulate signals to read and emulate RFID devices. Accordingly, the FPGA may be connected to the HF circuitry 104, the LF circuitry 106, and the UHF circuitry 108. The processor may receive a command from the Bluetooth interface 112 and configure the FPGA according to the command from the Bluetooth interface 112. For example, the FPGA may be configured to operate at HF, LF, UHF, or a combination of two or more frequency ranges, based on the command received by the processor from the Bluetooth interface 112. The FPGA may then accordingly modulate a commanded signal to the antenna(s) (HF, LF, UHF, or two or more thereof) in order to emulate an RFID device or transmit a carrier signal via the antenna(s) (HF, LF, UHF, or two or more there and then demodulate the received response in order to read an RFID device. When reading a device, the FPGA may send the demodulated bits to the processor. The processor may then send the bits to the Bluetooth interface 112, which then transmits the bits to the mobile application 120. The antenna and corresponding circuitry (HF 104, LF 106, or UHF 108) may be selected based on the command the processor receives from the Bluetooth interface 112. In some examples, the FPGA may only be configured to operate with the HF circuitry 104 and the LF circuitry 106. In such examples, the UHF circuitry 108 may include circuitry to modulate and demodulate signals. In some examples, the FPGA may modulate and demodulate UHF signals. In such examples, the FPGA may send and receive modulated data to the UHF circuitry 108.

In some examples, the control circuitry 110 includes a processor (e.g., a DSP) configured to communicate directly with the HF circuitry 104 including the HF antenna, the LF circuitry 106 including the LF antenna, and the UHF circuitry 108 including the UHF antenna. In such examples, a switch may select the appropriate circuitry and antenna (HF 104, LF 106, or UHF 108) to use to read or emulate.

The mobile application 120 may also communicate with cloud infrastructure 124. The cloud infrastructure 124 may include accounts keyed to specific users. Each account may include information regarding which RFID tags may be emulated by the HDT 102. The cloud infrastructure 124 may then communicate the RFID tag information to the mobile application 120. Which then can communicate the RFID tag information to the HDT 102 via the Bluetooth interface 112 (or USB 114). For example, an operator may have an access key containing a certain RFID tag which is used to unlock a door. The operator may upload the information included in the RFID tag to the operator's account in the cloud infrastructure 124. The operator may then download that tag information to the operator's mobile application 120, which can be stored in memory 126 on the mobile application 120. Then the operator may then use the mobile application 120 to command the HDT 102 to emulate the tag information to unlock the door, without the actual access key.

Similarly, an operator may share RFID tag information stored in the operator's account with a second operator by sending the RFID tag information to the second user's account. The second user may then unlock the door by downloading that RFID tag information from the second user's account via the mobile application 120 and then emulating the RFID tag information with the HDT 102 to unlock the door.

An operator may also read RFID tags using the HDT 102. For example, the HDT 102 may read, via the corresponding circuitry (HF 104, LF 106, or UHF 108), the tag information included in an RFID device 122. The HDT 102 may then send the read tag information to the mobile application 120. An operator may then save the tag information either locally in the mobile application 120 or upload the tag information to the operator's account in the cloud infrastructure 124. Accordingly, an operator may read an RFID tag 122 via the HDT 102 and save the tag information to the operator's account in the cloud infrastructure 124 and then allow access to that tag information to other operators. In some examples, an operator may read several RFID tags via the HDT 102, and store the information of each RFID in either the operator's account or locally on the mobile application 120. The operator may then emulate each stored tag as needed, eliminating the need to carry multiple RFID devices.

In some examples, the mobile application 120 may have access to a camera 128 of the mobile phone/tablet/computer running the mobile application 120. In some examples, an operator may take a picture of the RFID tag 122 with the camera 128, and the mobile application may automatically detect the tag type, thereby decreasing the time required to read the RFID tag 122. In some examples, the tag information may be acquired from the access badge without ever needing to read the card, but instead by using the numbers printed on the badge to identify the tag information. In some examples, the tag information may be created by the HDT 102 device and via the corresponding circuitry (HF 104, LF 106, or UHF 108), to be learned by the readers to work with the HDT 102.

An operator may also read a status of the HDT 102 via the mobile application 120. For example the HDT 102 may send a battery status to the mobile application 120. The HDT 102 may also indicate to the mobile application 120 whether it detects any RFID tags within the range of the HDT 102. The mobile application 120 may then give the user the option to read any RFID tag detected within the range of the HDT 102.

An operator may also update the firmware of the HDT 102 via the Bluetooth interface 112 or the USB interface 114. An operator may download an update via the mobile application 120 from the cloud infrastructure 124, and transfer the downloaded update information to the HDT 102 via the Bluetooth interface 112 or the USB interface 114. The HDT 102 may then download and install the update.

In some examples, the HDT 102 may include a cellular communication interface 130, for example a cellular IoT chip and may also include a global positioning (GPS") system module 132. The cellular communication interface 130 may provide access to the internet such that the HDT 102 may communicate directly with the cloud infrastructure 124 (i.e. rather than communicating with the cloud infrastructure 124 via the Bluetooth interface 112 and the mobile application 120). In such examples, the user interface 116 may include a display, for example a touchscreen display, which an operator may use to control the HDT 102. In such examples, an operator may access an account in the cloud infrastructure 124 directly from the HDT 102. For example, the operator may read an RFID tag and upload the RFID information directly to the cloud infrastructure 124. An operator may also download RFID information directly to the HDT 102 from the cloud infrastructure 124 in order to emulate an RFID tag (for example to access a garage or a door). The HDT 102 may also report its location, which is obtained via the GPS module 132, to the cloud infrastructure 124. The cloud infrastructure 124 may then communicate to the HDT 102 nearby parking lots, garages, or buildings, vehicles, etc., which may be accessed via emulating an RFID tag. The HDT 102 may then display such information to an operator via the user interface 116.

Figure 2A:
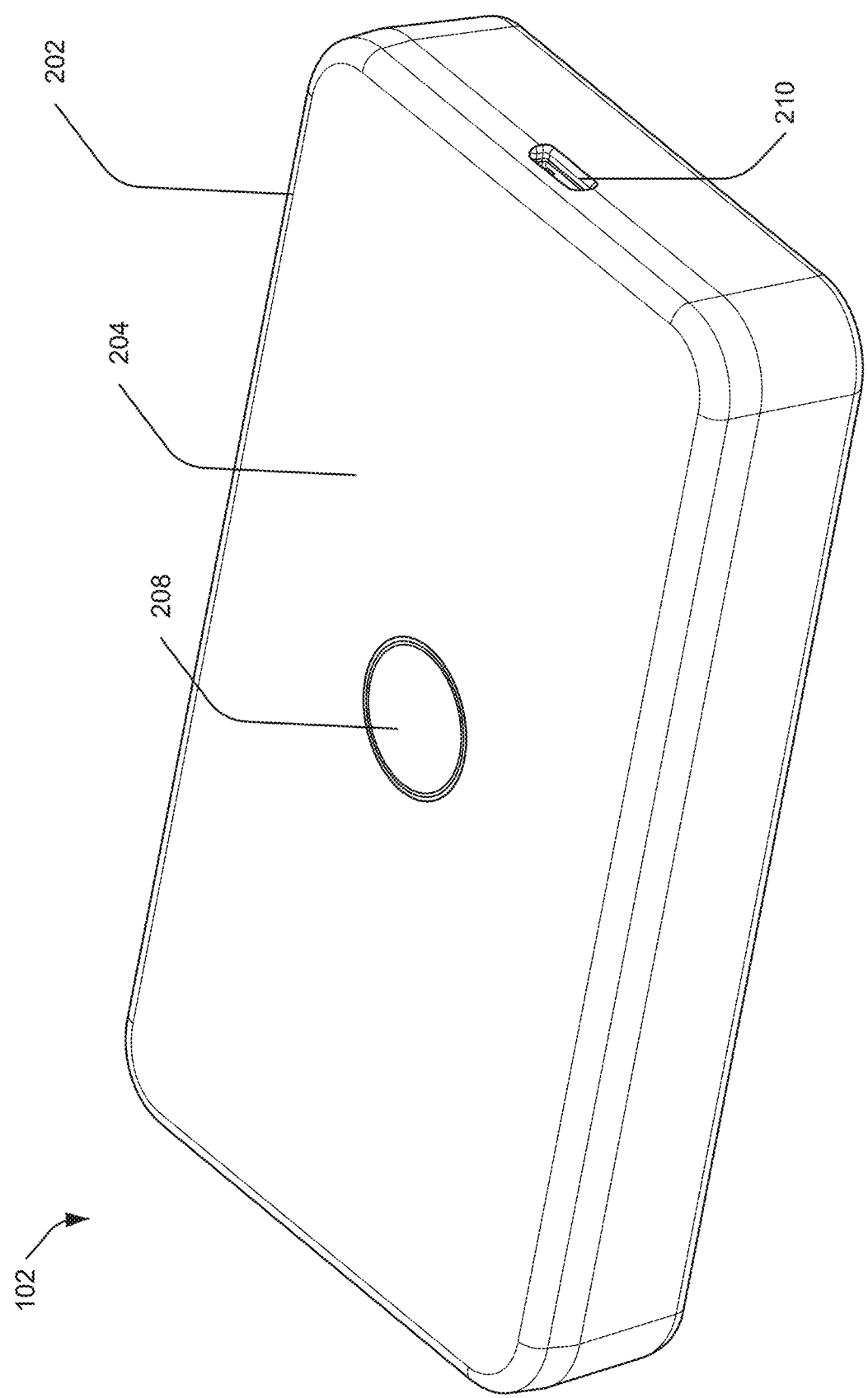
FIG. 2a is an illustration of an exterior view of an example handheld radio frequency identification reader and emulator.
Figure 2B:
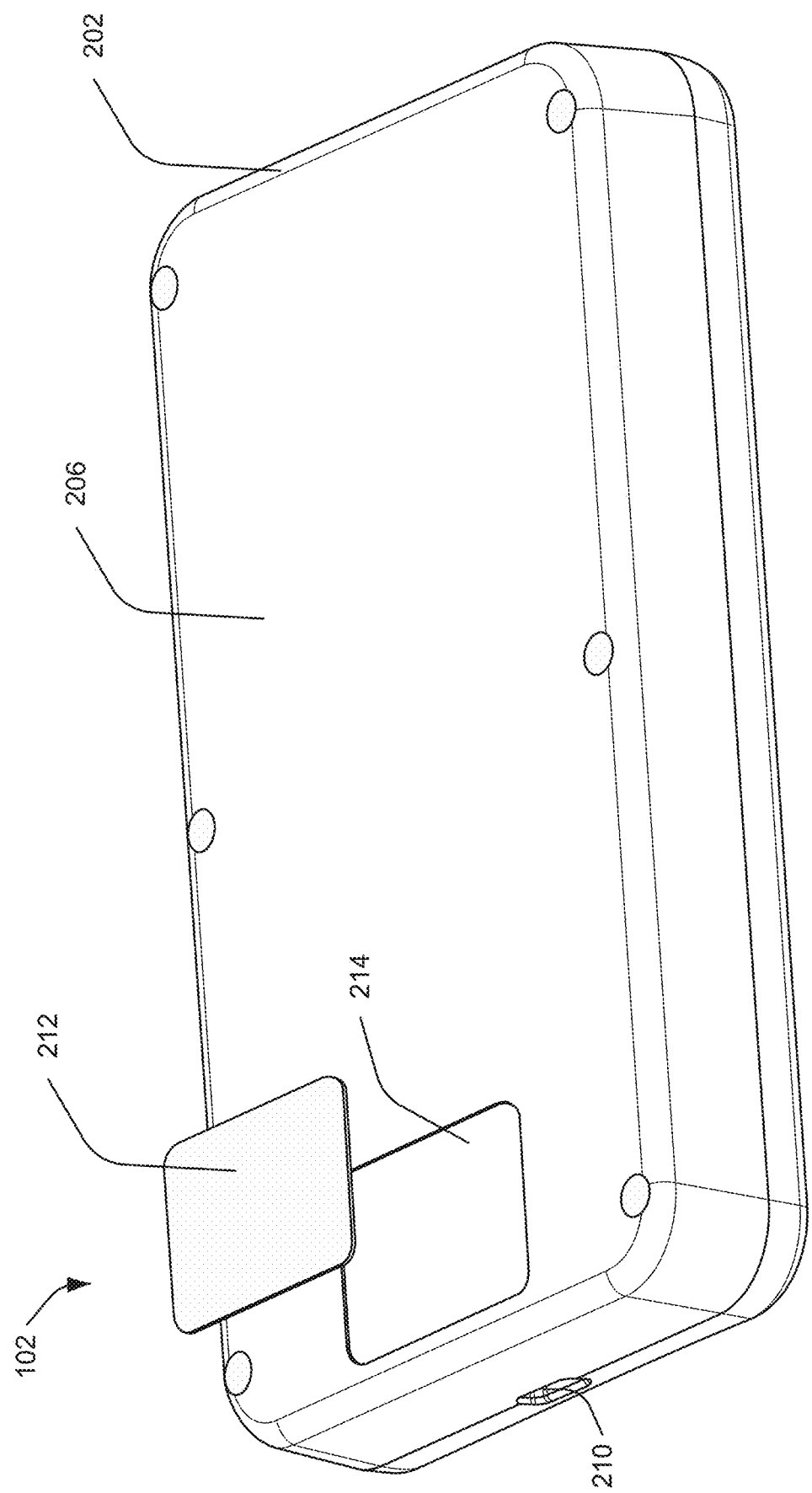
FIG. 2b is an illustration of an exterior view of an example handheld radio frequency identification reader and emulator.

FIG. 2a illustrates a front view of an example handheld dynamic radio frequency identification device, such as HDT 102 of FIG. 1. FIG. 2b illustrates a back view of the example handheld dynamic radio frequency identification device. The HDT has a case 202. The case 202 may include a case front 204 and a case back 206. As illustrated, the case front 204 and case back 206 are configured to securely engage each other to form the protective outer case 202. The case 202 is designed to absorb impact such that the HDT 102 may operate normally after repeated drops. For example the case 202 may withstand repeated 6 foot drops onto concrete. Accordingly, the case 202 may be made of a suitable material such as a polymer to absorb impact, and the internal hardware may be secured within the case 202 to withstand repeated impact.

The case 202 may be handheld. Accordingly, the case 202 may be less than approximately 5 inches in height, 2.5 inches in width, and 1 inch thick. Further, the case 202 may have texturing on the outer surface in order to increase friction and prevent the case from slipping in an operator's grip.

The case front 202 may include a button 208. The button 208 may be used as a user interface 116 to wake the HDT 102 from a sleep mode. The HDT 102 may typically operate in a low-power sleep mode to conserve battery 118 power. In some examples, when an operator decides to use the HDT 102, for example to connect the HDT to the mobile application 120 of FIG. 1, the operator may press the button 208 to wake the control circuitry 110 of the HDT 102 from the sleep mode and connect with the mobile application via the Bluetooth interface 112 (or USB 114). In some examples, the HDT 102 might always be connected to the mobile application 120 via the wireless connection/Bluetooth interface 112. The operator may also wake the control circuitry 110 from the mobile application 120 via the wireless connection/Bluetooth interface 112. After a threshold period of non-use, for example several seconds or minutes without receiving any commands from the mobile application 120, the HDT 102 may enter the sleep mode. In some examples, in the sleep mode the circuitry of the HDT 102 may be powered off except for the button 208 detection circuitry and/or the Bluetooth interface 120. Detection of the button 208, or a signal received via the Bluetooth interface 112 from the mobile application 120, may then wake the HDT 102 from the sleep mode.

The case 202 also may include an input port 210 for the USB interface 114. In some examples, the USB port 210 may accept a USB-B connector. In some examples, the USB port 210 may accept a USB mini connector. In some examples, the USB port 210 may accept a USB micro connector. In some examples, the USB port 210 may accept a USB-A connector. In some examples, the USB port 210 may accept a USB-"C" connector. In some examples, there may be no USB interface ports. The battery 118 of the HDT 102 may be charged via power received via a USB connector connected to the USB port 210. In some examples, the battery 118 of the HDT 102 may be charged via inductance power. The HDT 102 may also communicate with a mobile application 120 via a connector connected to the USB port 210.

The illustrated case back 206 has a plate 212 and a pocket 214 into which to secure the plate 212. The plate 212 may include product serial number information and Federal Communication Commission compliance information. In some examples, product serial number information and Federal Communication Commission compliance information may be directly printed onto or engraved into the case 202. In some examples, the product serial number information and Federal Communication Commission compliance information may be on a sticker that may be applied to the case 202.

FIG. 2c illustrates an example view of the interior of the case front 204. The illustrated case front 204 has an aperture 216 configured to receive and securely hold a button 208 in such a way that the button may be pressed and released when the case front 204 is engaged to the case back 206. FIG. 2d illustrates an example button 208 configured to be secured to the aperture 216 of the case front 204 as illustrated in FIG. 2c. The illustrated interior of the case front 204 has cross ribs 218 configured to secure a circuit board to the case front 204. The cross ribs 218 may also support an antenna board. The case front 204 also has engagement pins 220 configured to engage with corresponding engagement pins on the case back 206 to secure the case front 204 to the case back 206. The position of the engagement pins 220 may also secure a circuit board in position in the case front 204.

Figure 2E:
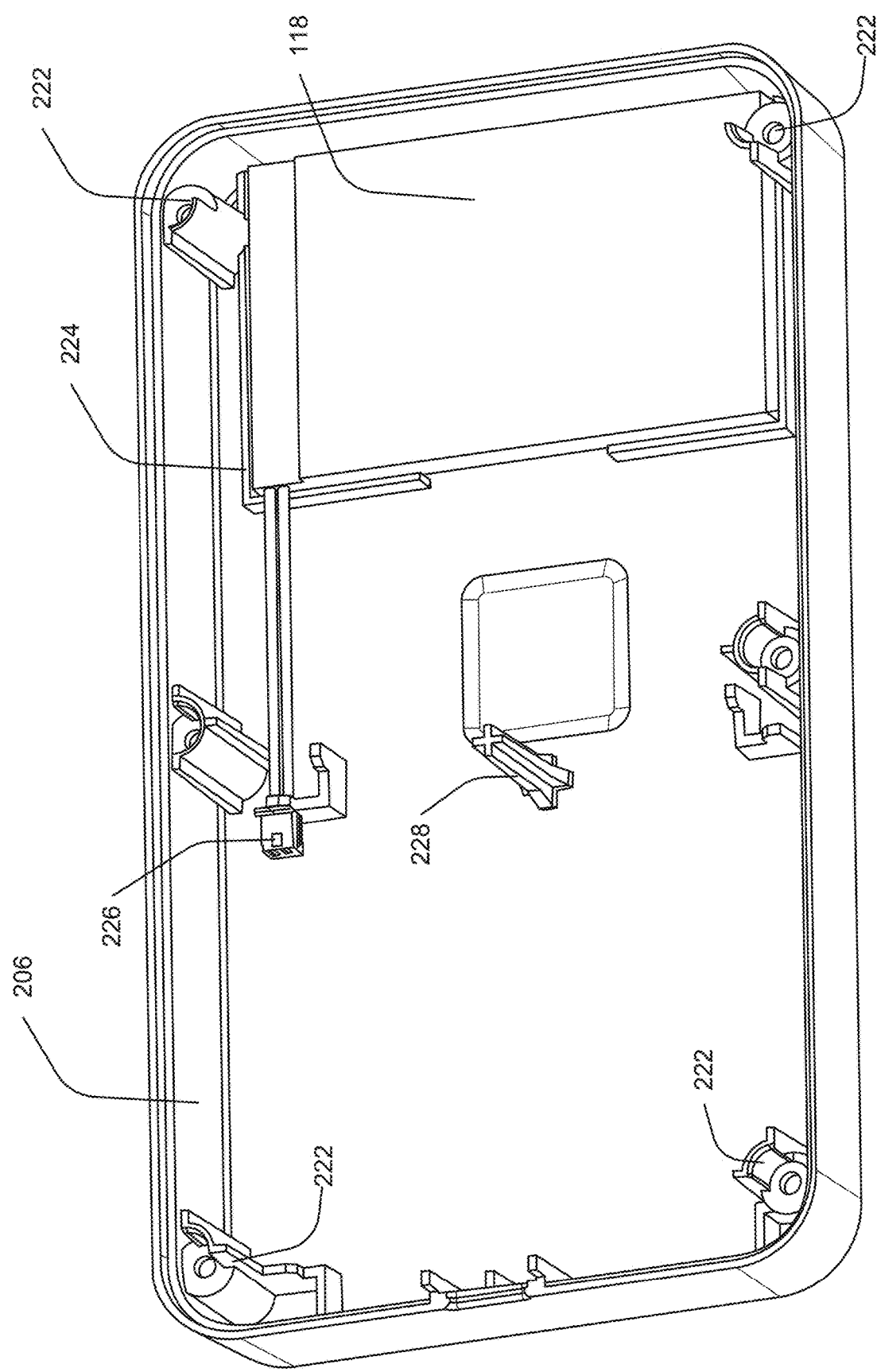
FIG. 2e is an illustration of a view of an example interior of a casing of a handheld radio frequency identification reader and emulator.

FIG. 2e illustrates an example view of the interior of the case back 206. The case back includes engagement pins 222 configured to engage with corresponding engagement pins 220 on the case front 204 to secure the case front 204 to the case back 206. The case back 206 also includes a pocket 224 configured to hold the battery 118 of the HDT 102. The battery 118 may be secured to the case back 206 via an adhesive. The battery 118 is electrically connected to a battery connector 226 which connects to a circuit board to provide power to the circuit board and to receive charging power when the HDT 102 is connected to an external power source via the USB input port 210. The case back 206 also includes a cross rib 228 configured to secure an antenna board. The cross rib 228 may also support a main board. The position of the engagement pins 222 may also secure an antenna board in position in the case back 206.

Figure 3A:
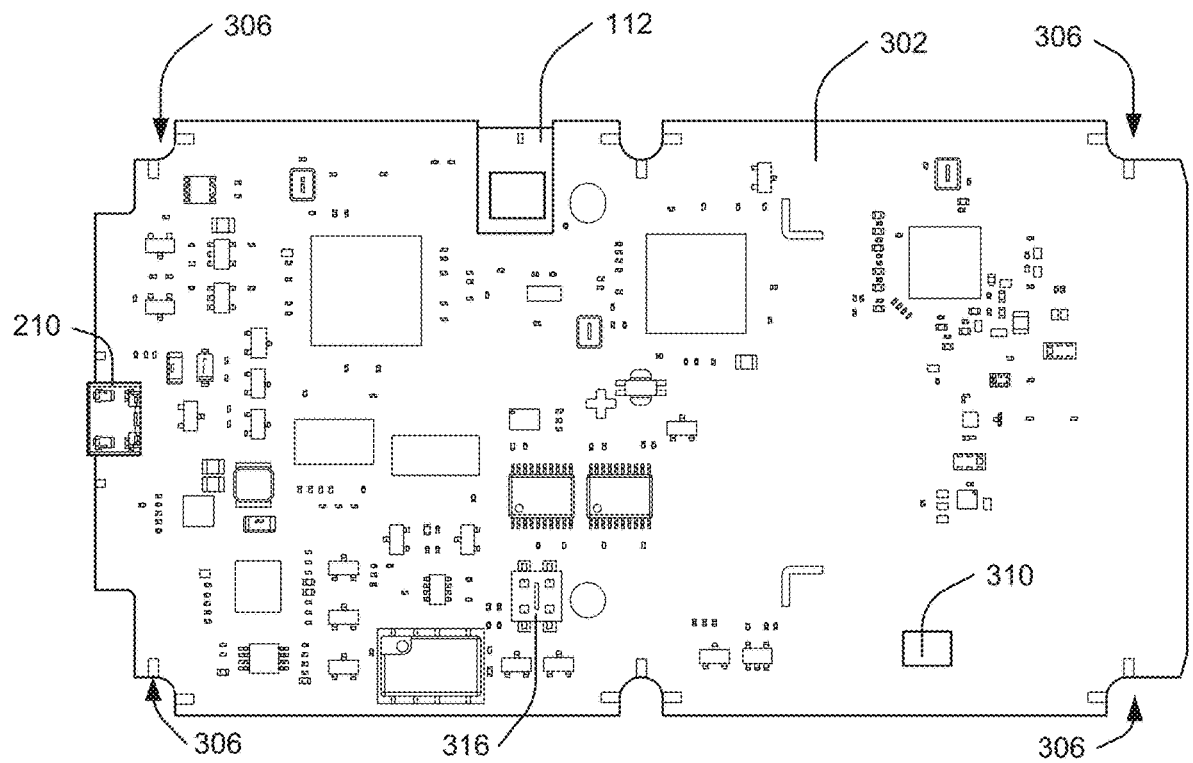
FIG. 3a is an illustration of a top view of an example circuit board of a handheld radio frequency identification reader and emulator.
Figure 3B:
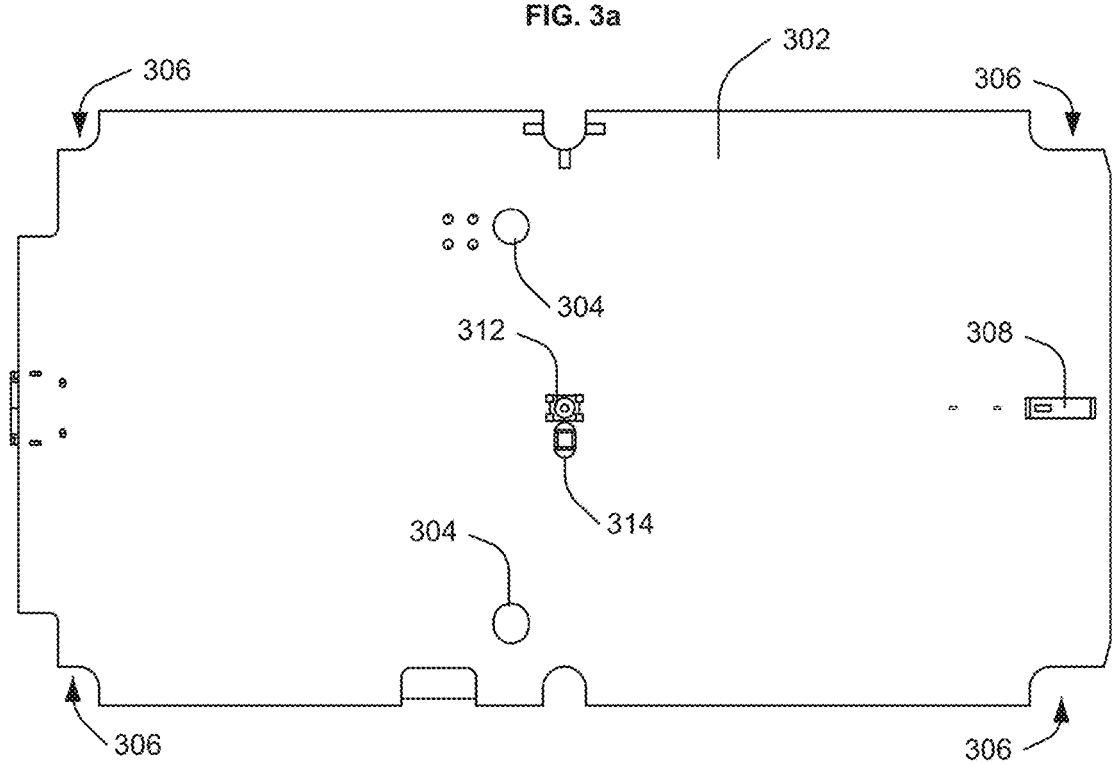
FIG. 3b is an illustration of a bottom view of an example circuit board of a handheld radio frequency identification reader and emulator.

FIG. 3a illustrates a front view of an example circuit board 302 of the HDT 102, and FIG. 3b illustrates a back view of the example circuit board 302. The example circuit board includes a USB port 210 and a Bluetooth module/interface 112. The Bluetooth module 112 may be used to communicate with a mobile application 120. The example circuit hoard 302 includes apertures 304 to receive the cross ribs 218 of the case front 204 in order to secure the circuit board 302 into place within the case 202. The example circuit board 302 also includes slots 306 which are formed to fit securely to the engagement pins 220 of the case front 204 to secure the circuit board 302 into place within the case 202. The circuit board 302 also includes a UHF antenna 308 which may be a pattern printed onto the circuit board 302 and which is connected to UHF circuitry 108 and control circuitry 110 on the circuit board 302. The UHF antenna 308 may be a 902 MHz to 928 MHz antenna that meets the United States standard, and the UHF circuitry 108 may include a 900 MHz match circuit.) The UHF antenna 308 may be a 858 MHz to 960 MHz antenna that meets the international standard, and the UHF circuitry 108 may include a 142 MHz-1050 MHz matching circuit.

The circuit board 302 also includes a battery connector 310, which may be electrically connected to the battery 118 to power the control circuitry 110, the HF circuitry 104, the LF circuitry 106, the UHF circuitry 108, and the Bluetooth interface 112. The battery connector 310 may also be used to charge the battery 118.

The example circuit board 302 also includes a switch 312. The switch 312 may be manipulated by an operator pressing the button 208 of FIGS. 2a-2d. In some examples, at least a portion of the button 208 is translucent. Accordingly, the circuit board 302 may include an indicator light 314 (e.g., an LED), which may indicate to an operator when the HDT 102 is in an operating mode or is in a sleep mode. For example, the indicator light 314 may turn on when the HDT is in an operating mode and off when in a sleep mode. In some examples, the indicator light 314 may be one color when in an operating mode and another color when in a sleep mode. In some examples, the indicator light 314 may flash at a set frequency and/or color to indicate status to an operator. For example, the indicator light 314 may flash at a set, frequency and/or color when the HDT 102 is emulating and another set frequency and/or color when the HDT 102 is reading. In some examples, the indicator light 314 may flash at a set frequency and/or color to indicate to an operator that the battery 118 needs to be recharged.

The example circuit board 302 also includes a board-to-board (BTB) connector port 316. The BTB connector port 316 includes slots configured to receive pins from corresponding BTB connector pins of an antenna board in order to connect control circuitry 110 on the circuit board 302 to an antenna board including an HF antenna and a LF antenna.

Figure 4:
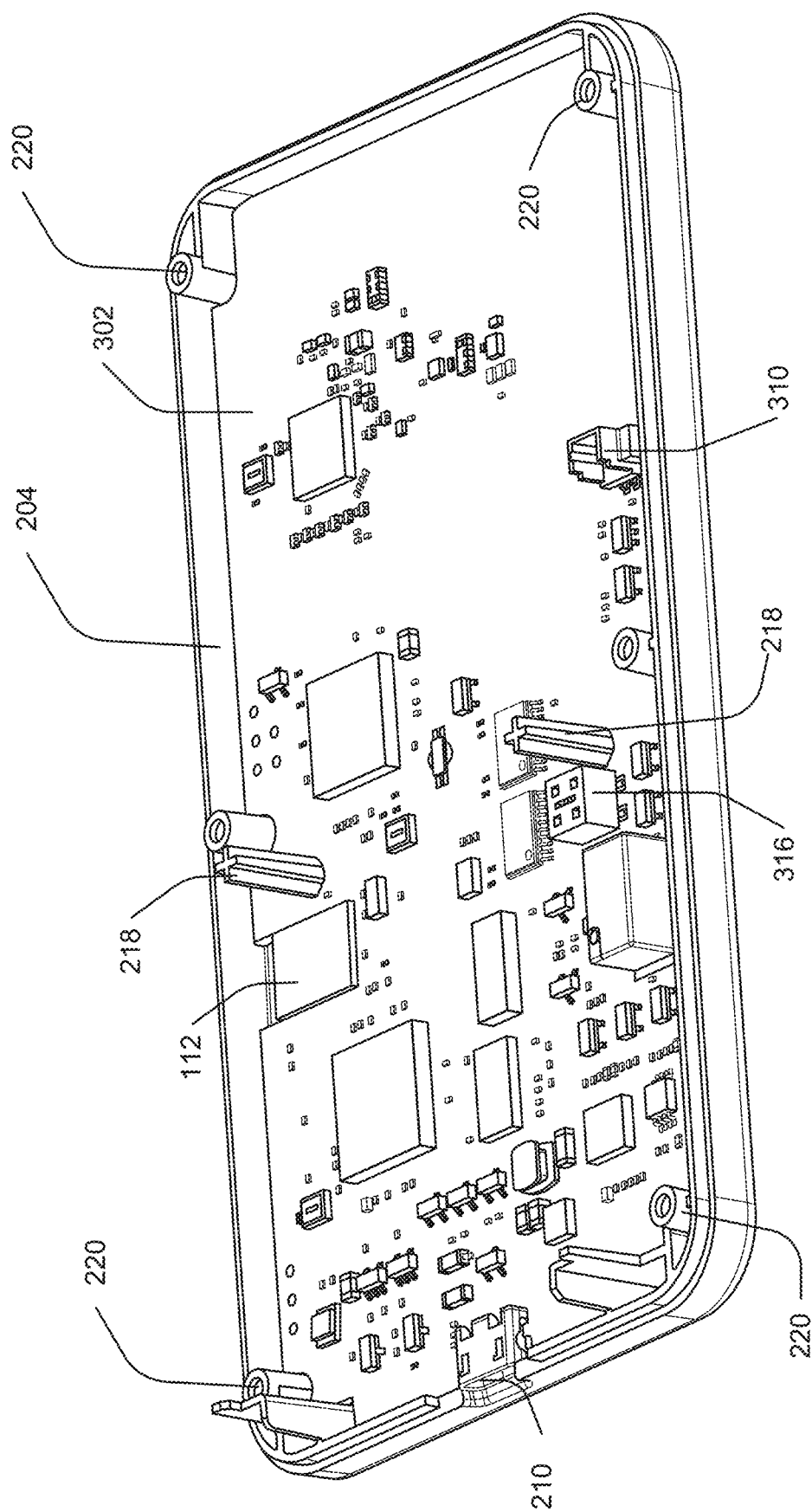
FIG. 4 is an illustration of an example circuit board within a casing of a handheld radio frequency identification reader and emulator.

FIG. 4 illustrates the example circuit board 302 of FIGS. 3a-3b secured within the case front 204 of FIG. 2c. As illustrated, the cross ribs 218 are engaged with the apertures 304 and the engagement pins 220 are coupled to the slots 306 to secure the circuit board 302 to the case front 204.

Figure 5:
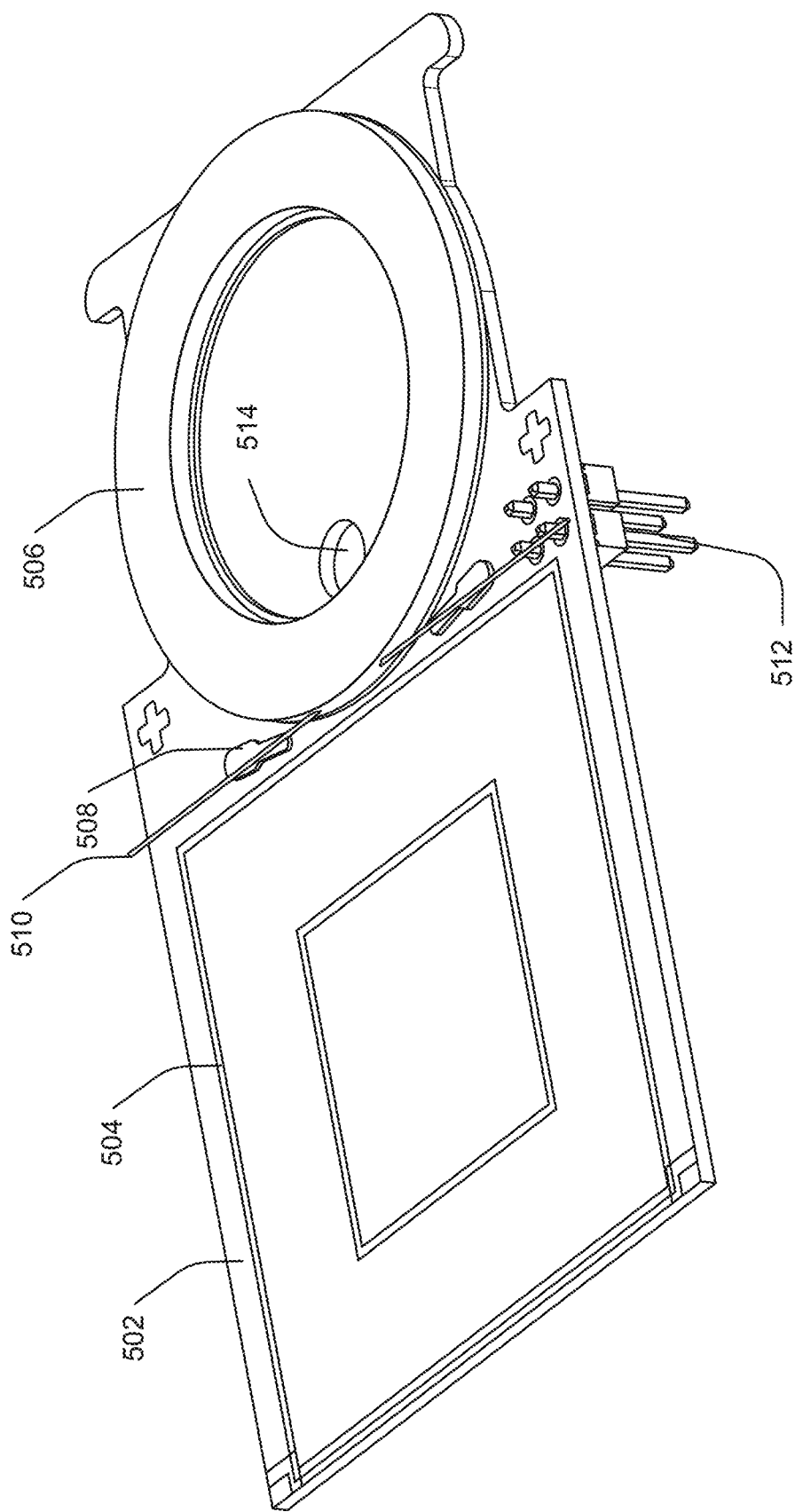
FIG. 5 is an illustration of an example antenna assembly of a handheld radio frequency identification reader and emulator.

FIG. 5 illustrates an example antenna board 502. The antenna board includes an antenna 504 and an LF antenna 506. As illustrated, the HF antenna 504 may be a pattern printed onto the antenna board 506 (a printed circuit board). As illustrated, the LF antenna 506 may be secured to the antenna board via an adhesive. As displayed in FIG. 5, the HF antenna and the LF antenna 506 may be adjacent. In some examples, the HF antenna 504 and the LF antenna 506 may overlap to conserve space and allow the HDT 102 to be smaller and more ergonomic while not sacrificing antenna functionality. For example, the LF antenna 506 may overlap the HF antenna 504 by 50 percent. The LF antenna 506 is connected to connector pads 508 via connection wires 510. The connection wires 510 may be soldered to the connector pads 508. The connector pads 508 and the HF antenna 504 are electrically connected to the BTB connector pins 512.

BTB connector pins 512 may be used to connect the antenna board 502 to control circuitry 110 on the circuit board 302 using BTB connector port 316 of FIG. 3a. The antenna board 502 may have an aperture 514 configured to receive a support rib (i.e. the support rib 228 of FIG. 2e) to secure the antenna board.

Figure 6:
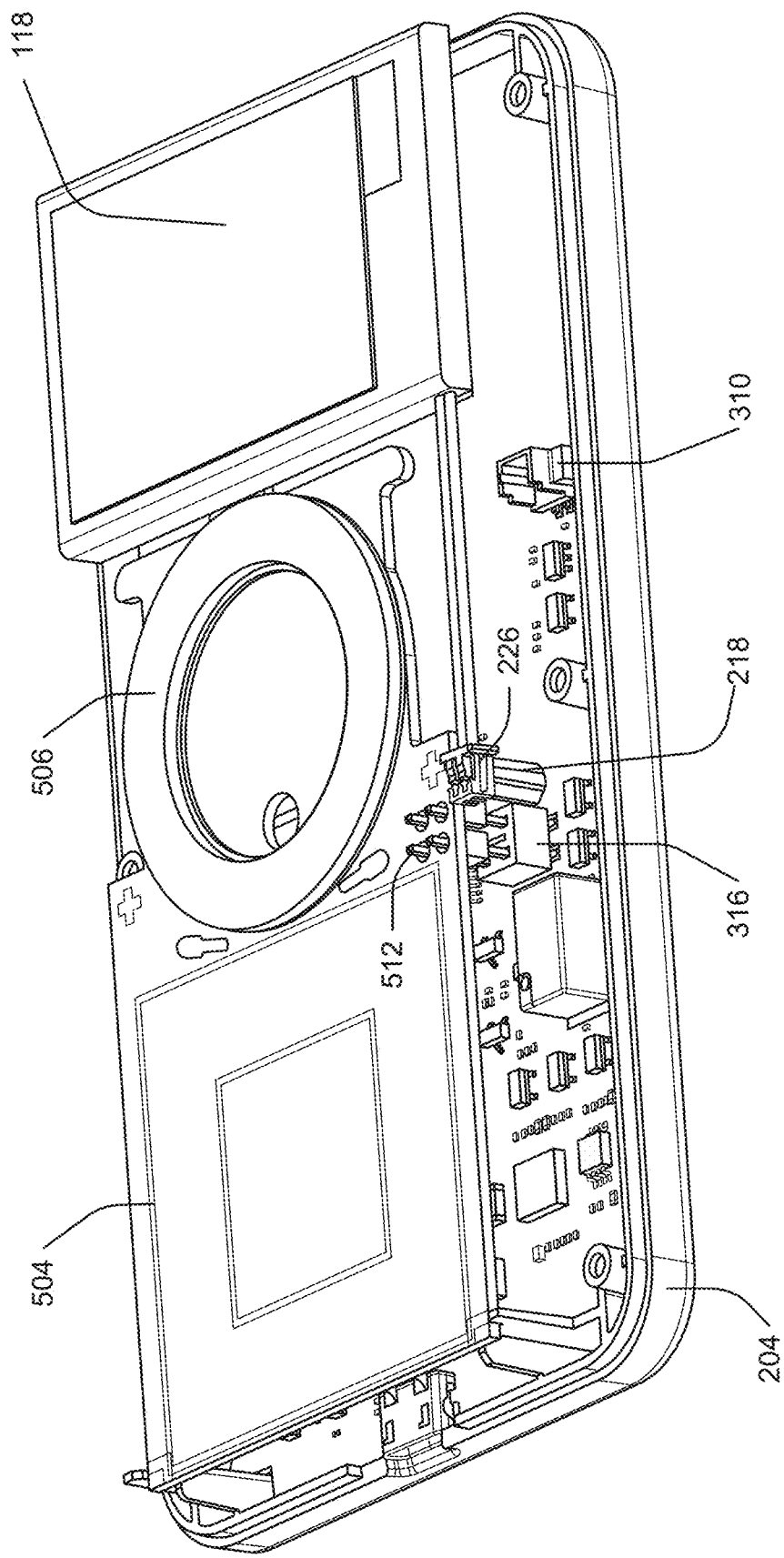
FIG. 6 is an illustration of an example circuit board, battery, and antenna assembly within a casing of a handheld radio frequency identification reader and emulator.

FIG. 6 illustrates an example view of the example circuit board 302 secured within the case front 204, and an example antenna board 502 connected to the circuit board. The view of FIG. 6 shows an example HDT 102 with the case back 206 hidden. As illustrated, the circuit board 302 is electrically connected to the antenna board 502 via the BTB connector port 316 and the BTB connector pins 512. The antenna board 502 is supported by cross ribs 218. The battery 118 is connected to control circuitry 110 on the circuit board 302 via engaging battery connector 226 to battery connector 310 of the circuit board 302.

As illustrated in FIG. 6, an example antenna board 502 may be offset from an example circuit board 302 sufficiently to allow the HF antenna 504 and the LF antenna 506 to properly resonate at the required frequencies. The offset may also be kept to a minimum in order to reduce the width of the HDT 102.

Figure 7:
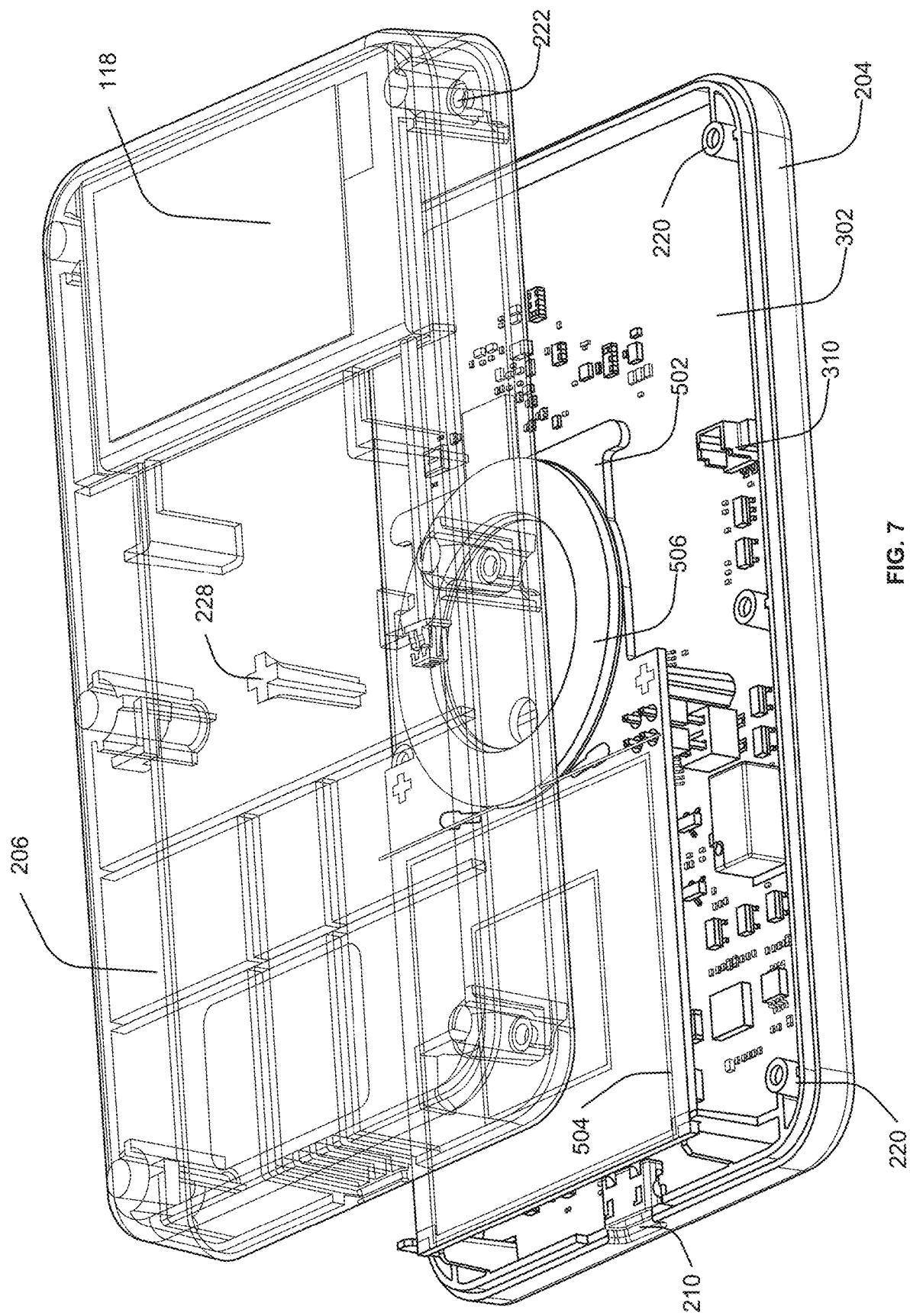
FIG. 7 is an illustration of an example exploded view of a circuit board, battery, and antenna assembly within a casing of a handheld radio frequency identification reader and emulator.

FIG. 7 illustrates an example exploded view of the HDT 102 as illustrated and described in FIGS. 2-6. As illustrated, the battery 118 may be adhered to the case back 206 via an adhesive. The case back 206 may engage with and secured to the case front 204 via corresponding engagement pins 220 and 222.

Figure 8:
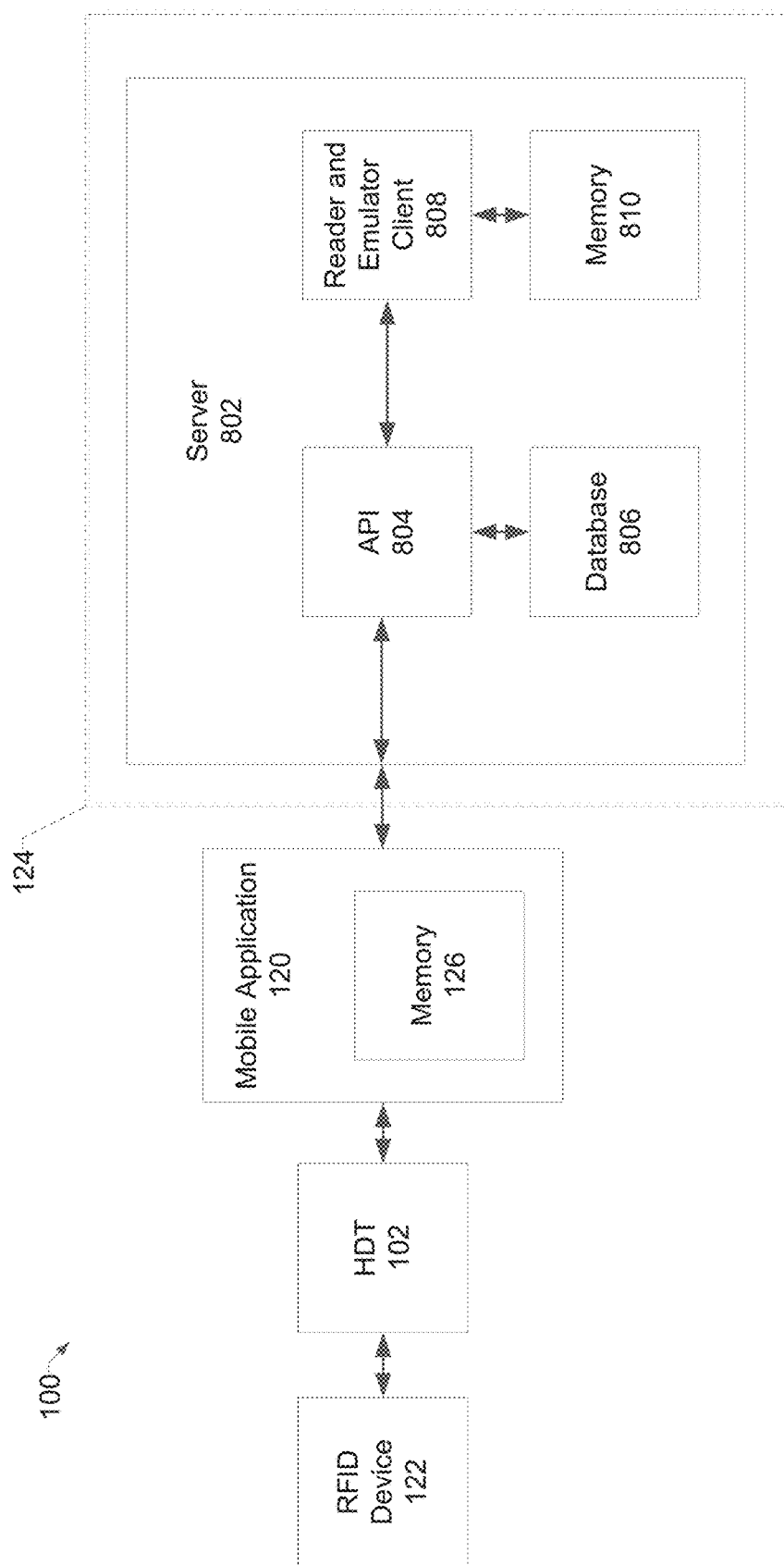
FIG. 8 is a block diagram of an example radio frequency identification reader and emulator system.

FIG. 8 is a block diagram of an example radio frequency identification reader and emulator system, for example the system 100 of FIG. 1. As described with reference to FIG. 1, the system 100 includes an HDT 102, a mobile application 120, and cloud infrastructure 124. Cloud infrastructure 124 may include a server 802. The server 802 may host an application programming interface (API) 804 and include a database 806 for storing data. The mobile application 120 may communicate with the API 804, and thus transmit data to and receive data from the client 808 and database 806 via the API 804.

The server 802 may also host a reader and emulator client 808 (the "client"). The server may also have memory 810 which may store images and files for the client. The client 808 may host and/or run software, for example open source Proxmark3 software, which may read and emulate various RFID tags. See, for example https://github.com/Proxmark/proxmark3 and http://www.proxmark.org/files/.

For example, the memory 810 may include executable code to read various types of RFID tags. When an operator initiates a read command via the mobile application 120, the mobile application 120 may send a request, to the API 804. The API 804 may then grab the appropriate reader executable code from the client 808, which retrieved the appropriate executable code from memory 810. The API 804 then may return the executable code to the mobile application 120, which may forward the executable code to the EMT 102. The HDT 102 may then use that executable code to read the RFID tag. In some examples, the client 808 may be hosted on a second server (not shown), which the API 804 may connect to and communicate with via a virtual port.

Figure 9:
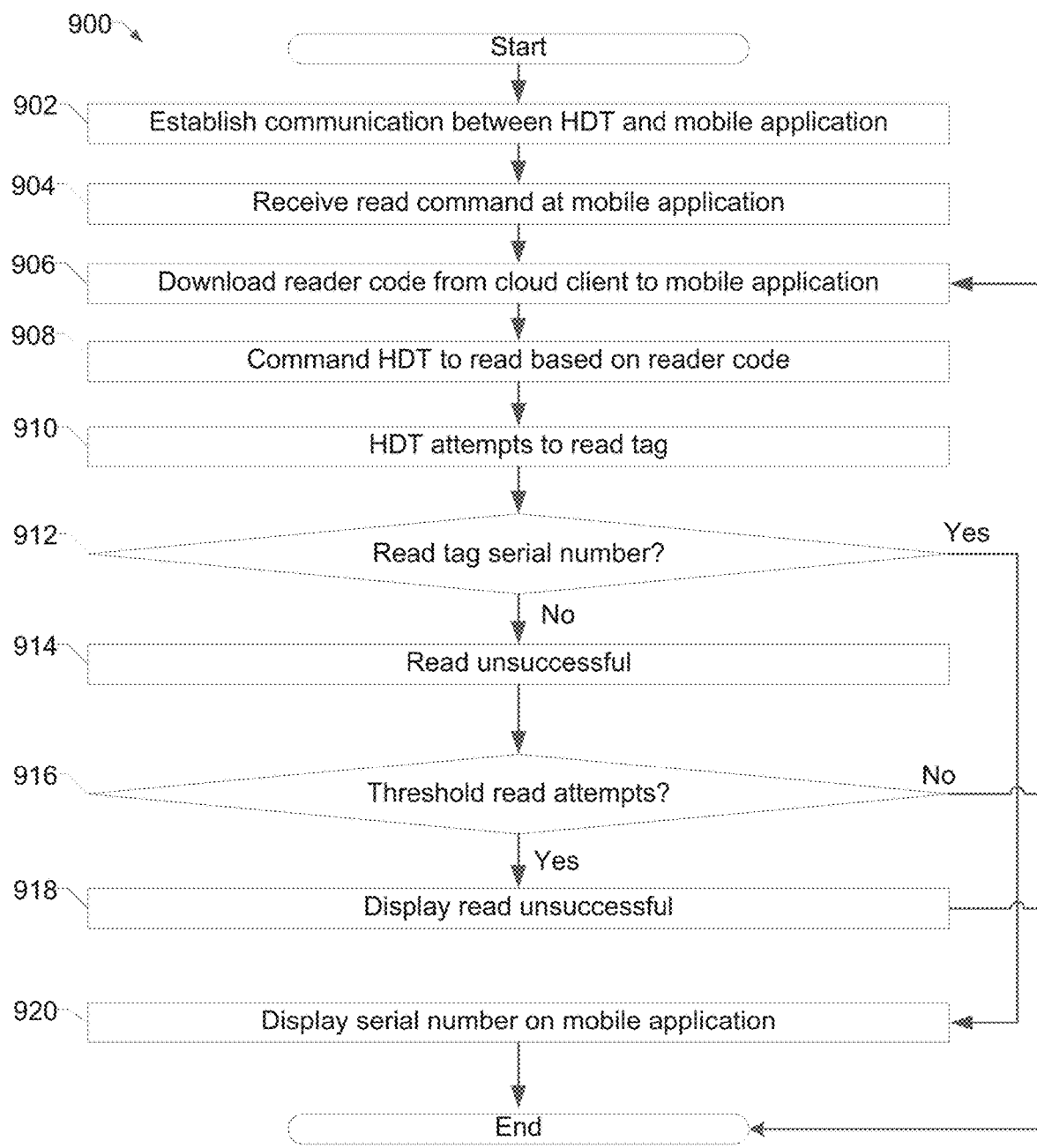
FIG. 9 is a flowchart representative of an example method of reading a radio frequency identification tag using a handheld radio frequency identification reader and emulator.

FIG. 9 shows a flowchart of an example method 900 of reading an RFID tag using the RFID reader and emulation system 100 of FIGS. 1 and 8 and the HDT 102 of FIGS. 1-8. At block 902, communication is established between the HDT 102 and the mobile application 120, for example via a Bluetooth connection via the Bluetooth interface 112 or USB 114. For example, an operator may press a button 208 to wake the HDT 102 from a sleep mode and establish communication with the mobile application 120. At block 904, the operator enters a read command via the mobile application 120. When entering a read command, in some examples, the operator may also input specific information about, the RFID tag to be read, such as the tag frequency range, tag manufacturer (e.g., HID), or tag type. In some examples, such tag information may be displayed on the tag. For example, an access badge may show that it is an HID tag with a series of identifying numbers. In some examples, an operator may take a picture of the RFID tag to be read with the camera 128, and the mobile application 120 or a program in the API 804 may automatically detect the tag type and/or other information about the RFID tag to be read. In some examples, the operator may not input any tag information because the tag information can be accessed by pulling tag information directly from an administrative system or access controller system that the operator has been assigned a badge from. In some examples, the tag information may be created by the HDT 102 to be learned by a reader.

At block 906, the mobile application 120 downloads executable code to read the RFID tag. For example, the mobile application may send a request to the API 804 including tag type. The API 804 then retrieves from the client 808 the appropriate executable code to read that tag type and sends that retrieved executable code to the mobile application 120. In some examples, the API 804 only retrieves from the client 808 a portion of the appropriate executable code, i.e. the executable code to read a subset of the selected tag types, to limit the total download. If that portion does not successfully read the RFID tag, then as discussed in more detail below, the API 804 may retrieve the next portion of the appropriate executable code. The system 100 may repeat this process until the RFID tag is successfully read, or until all of the appropriate executable code has been run, but there was no successful read, indicating a problem with the RFID tag. In some examples, the operator may not input a tag type or any other discriminating tag information (e.g., manufacturer or operating frequency). In such examples, the system 100 may iteratively run portions of the reader executable code until the RFID tag is successfully read or until all of the reader executable code has been run without a successful read.

At block 908, the mobile application sends a read command to the HDT via the Bluetooth interface 112 or USB 114 based on the reader executable code downloaded from the cloud client 808 via the Bluetooth interface 112 or USB 114. At block 910, the HDT 102 attempts to read the tag based on the received read command from the mobile application 120. At block 912, the HDT 102 returns read bits to the mobile application 120 and the mobile application 120 determines Whether the serial number of the RFID tag has been successfully read using the reader code. If the serial number was not successfully read (block 912) then at block 914 the mobile application 120 determines that the read operation was unsuccessful. Then at block 916 the mobile application 120 checks if a threshold number of read attempts have been run, (i.e., whether all of the appropriate reader executable code been run). If a threshold number of read attempts have been run (block 916), then at block 918, the mobile application 120 displays to the operator that the read was unsuccessful. If the threshold number of read attempts was not reached, (i.e., there is more reader executable code to be run), then the process returns to block 906, and the mobile application 120 downloads the next portion of the reader executable code and repeats block 906-912.

Returning to block 912, if the HDT 102 successfully read the serial number of the tag, then at block 920 the mobile application 120 displays the serial number.

Figure 10:
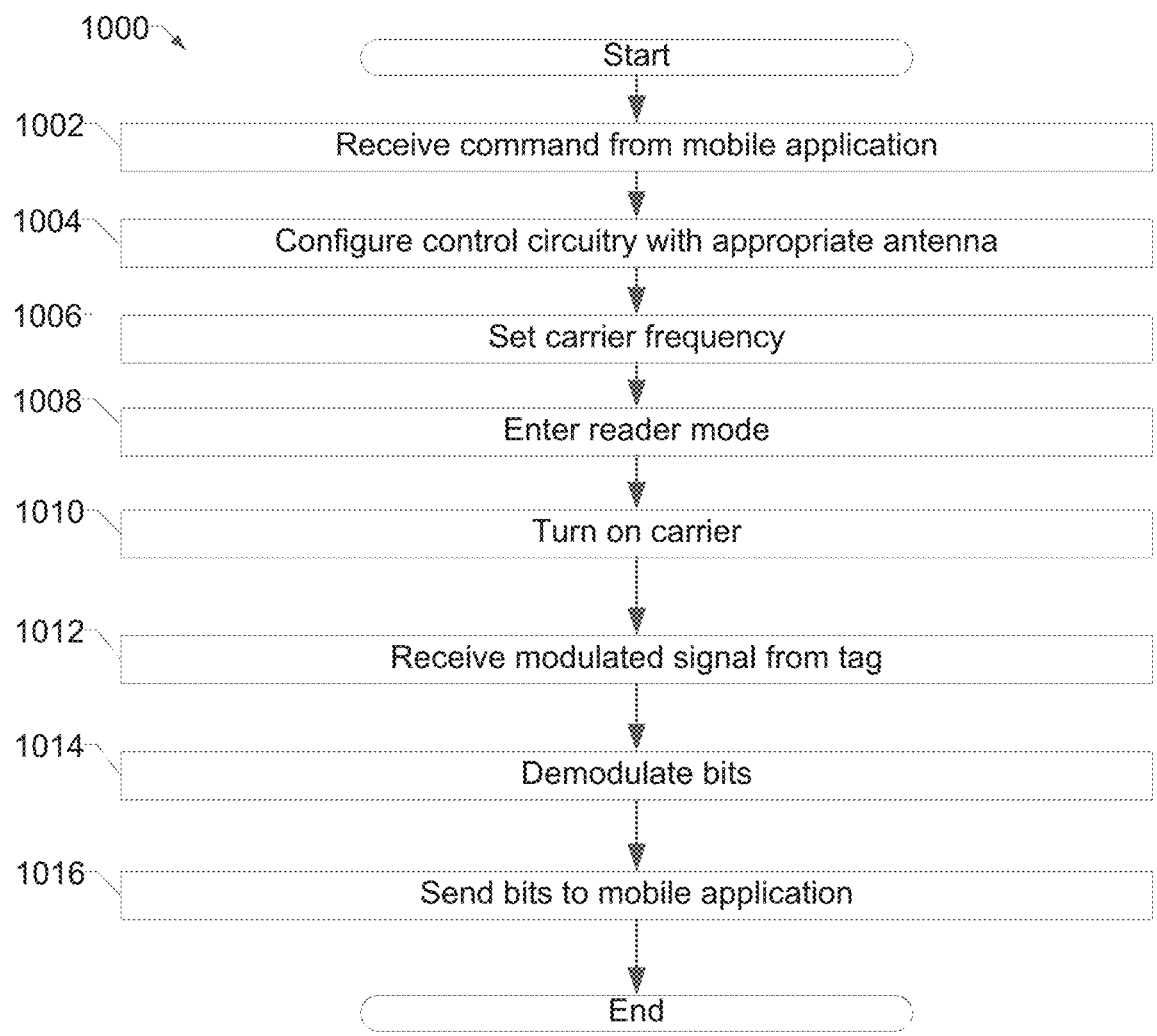
FIG. 10 is a flowchart representative of an example method of reading a radio frequency identification tag using a handheld radio frequency identification reader and emulator.

FIG. 10 shows a flowchart of an example method 1000 of reading an RFID tag using the HDT 102. Example method 1000 may correspond to blocks 908-912 of example method 900 of FIG. 9.

At block 1002, the control circuitry 110 of the HDT 102 receives a read command from the mobile application 120 via the Bluetooth interface 112 or USB 114. The command may include a carrier frequency setting. The control circuitry 110 may include a processor and a field-programmable FPGA. In some examples, one FPGA may operate with both the HF circuitry 104 and LF circuitry 106, and only requires a configuration change to switch between working with the HF circuitry 104 and the LF circuitry 106. The UHF circuitry 108 may be driven directly by the processor and the UHF circuitry 108. In some examples the LF, or UHF circuitry may only be driven by a processor in control circuitry 110 with a Bluetooth interface 112 built in.

At block 1004, the control circuitry 110 is configured to work at the commanded frequency. For example, the processor may command the FPGA be configured work with the HF circuitry 104 or the LF circuitry 106.

At block 1006, the carrier frequency at which to transmit, and thereby read, is set in the control circuitry 110 (i.e., the FPGA). At block 1008, the HDT 102 enters reader mode, and at block 1010 the HDT turns on the carrier to transmit a reader signal from the selected antenna (LF, HF, or UHF). At block 1012, the HDT 102 receives a modulated backscatter signal back from the RFID tag via the selected antenna.

At block 1014, the control circuitry 110 demodulates the modulated backscatter signal to a series of bits. For example, the envelope of the received signal from the antennas may be detected using analog circuitry on the board and then the envelope signal may be decoded by the FPGA (collectively included in control circuitry 110 of FIG. 1). Accordingly, the FPGA may be configured as an edge detector to delineate bit periods, control automatic gain adjustment, and frame the detected bits to provide to the processor (of the control circuitry 110) for further decoding. Collectively the demodulation step 1014 includes performing the envelope detection, data/bit timing recovery, and demodulation of the signal received from the antenna such that a raw unmodulated series of bits can be obtained. In some examples, the FPGA may also be configured to detect the envelope of the received signal using digital signal processing and an analog to digital converter rather than analog circuitry detecting the envelope.) For descriptions of envelope detectors, see J. D. Griffin and G. D. Durgin, "Link Envelope Correlation in the Backscatter Channel," *IEEE Communication Letters*, vol. 11, no. 9. The entirety of "Link Envelope Correlation in the Backscatter Channel," is incorporated by reference. Also see U.S. Published Patent Application No. 2015/0136857 by Nicolas Min, et. al, filed Nov. 6, 2014 titled "Envelope detector circuit." The entirety of U.S. Published Patent Application No. 2015/0136857 is incorporated by reference. Also see U.S. Pat. No. 7,689,195 by Jiangfeng Wu and Donald Edward Major, filed Jun. 16, 2005, titled Multi-protocol radio frequency identification transponder transceiver. The entirety of U.S. Pat. No. 7,689,195 is incorporated by reference.

At block 1016, the control circuitry 110 may then transmit the bit string to the mobile application 120 via the Bluetooth interface 112 or USB 114.

Figure 11:
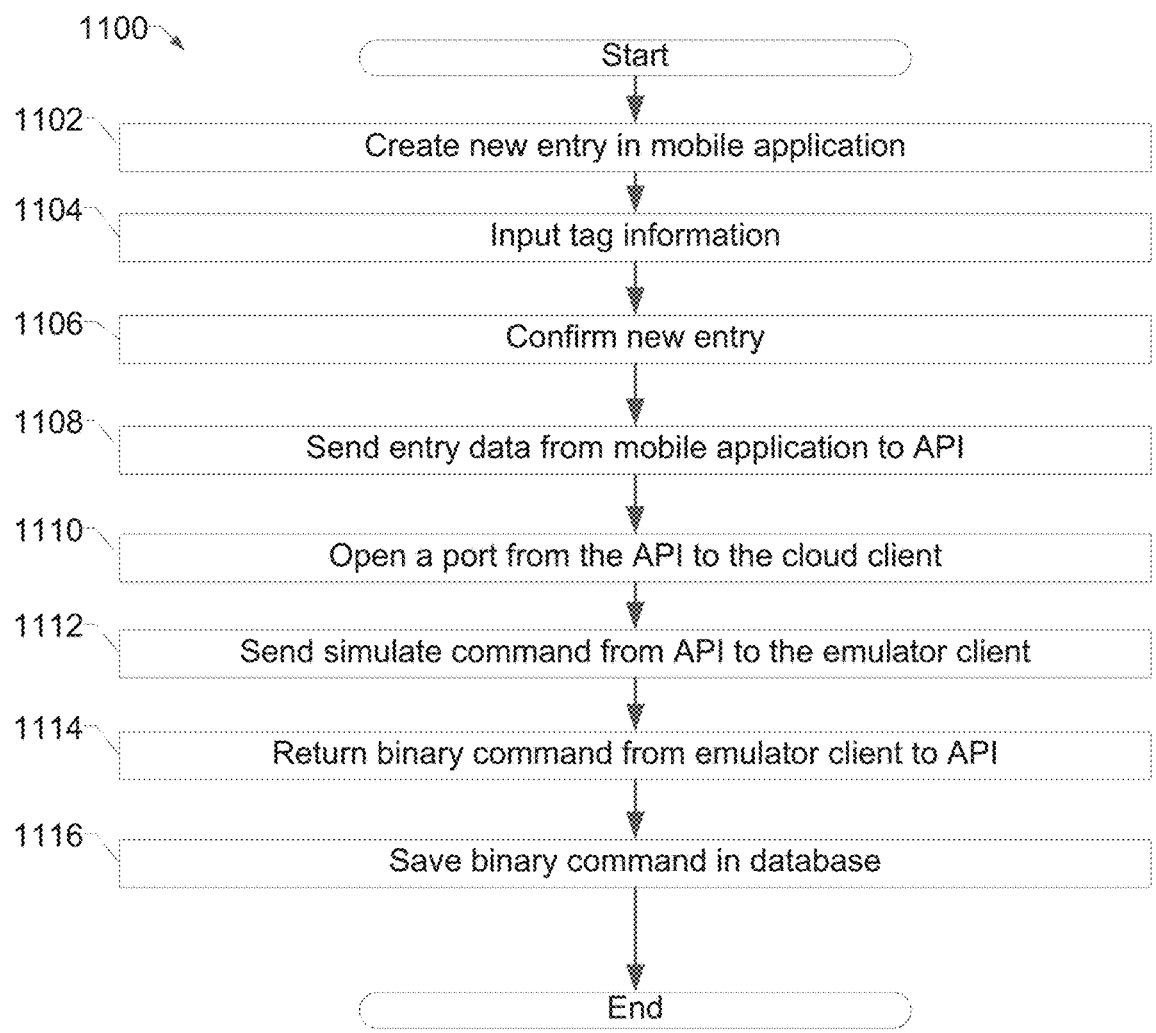
FIG. 11 is a flowchart representative of an example method of storing radio frequency identification tag information in cloud infrastructure for later use and/or access.

FIG. 11 shows an example method 1100 in which RFID tag information may be saved into an operator account in cloud infrastructure 124 for either Later use or to share with other operators.

At block 1102, the operator creates a new entry in a mobile application 120. In some examples, an operator may create the entry in a web application, for example a web application running on a desktop computer, a laptop computer, a tablet computer, or a mobile phone. The entry may include information such as a specific parking garage or lot to which the RFID tag may provide access, or a specific office building to which the RFID tag may provide access.

At block 1104, RFID tag information is input into the entry. In some examples, RFID tag information (i.e., a serial code and a tag type) is read from a physical RFID tag via an HDT 102, for example using the method 900 of FIG. 9 and then loaded into the entry at block 1104. In some examples, an operator may enter in the tag information, for example by manually typing in the information and/or selecting a tag type, for example via a drop down list. At block 1106, the operator confirms the new entry. After the operator confirms the new entry (block 1106), at block 1108, the mobile or web application 120 sends the entry data to an API 804 in the cloud infrastructure 124. At block 1110, the API 804 opens a port to the client 808. At block 1112, the API 804 sends a simulate command to the client 808. The simulate command includes the tag type information and serial code input at block 1104. At block 1114, the client returns a binary command to the API 804. The binary command is created based on the input tag type and the serial number. The binary command can be used by an HDT 102 to emulate the RFID tag having the input tag type and serial number.

At block 1116, the API stores the binary command in the database 806. The binary command may be stored in the database 806 in an entry along with the rest of the entry information input by the operator at blocks 1102-1104. The entry in the database 806 may also be keyed to the operator's account. For example, an account may be keyed to a telephone number, and the database entry also stores the telephone number of the mobile phone running the mobile application 120 on which the entry was created.

Figure 12:
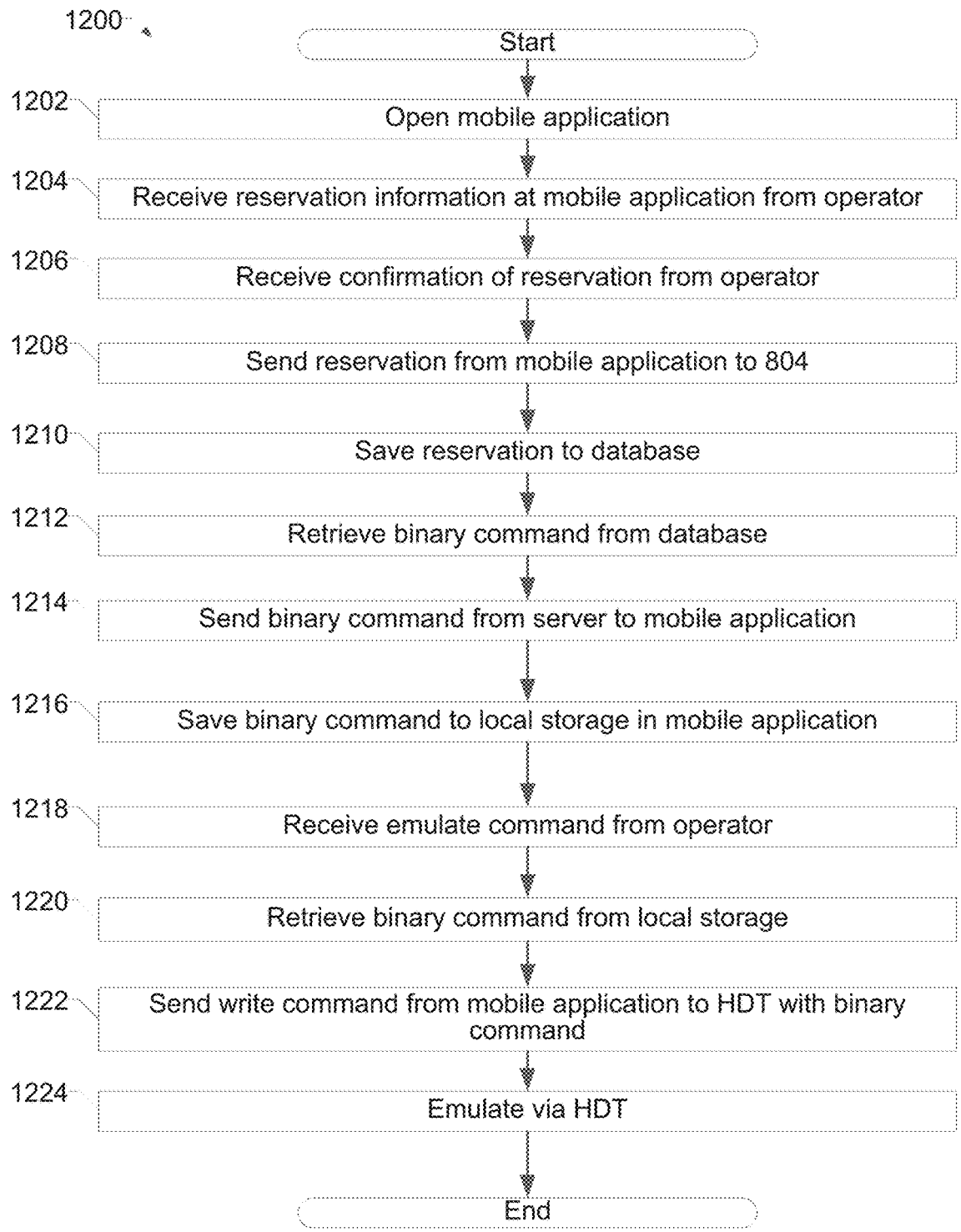
FIG. 12 is a flowchart representative of an example method of emulating a radio frequency identification tag using a handheld radio frequency identification reader and emulator.

FIG. 12 shows an example method 1200 of emulating radio frequency identification tag using a handheld radio frequency identification reader and emulator.

At block 1202, an operator opens a mobile application 120. At block 1204, the operator creates a reservation which requires an RFID tag to access. For example, an operator may create a reservation for a specific parking lot or for a specific hotel room. In some examples, the reservation may include a block of time, i.e. a time period during which the emulation will work. At block 1206, the operator confirms the reservation.

After the operator confirms the reservation (block 1206), at block 1208 the mobile application sends the reservation to the API 804. At block 1210, the API 804 saves the reservation to the database 806 and determines the necessary RFID tag information that corresponds to the reservation (e.g., the RFID tag information that provides access to a door or garage). At block 1212, the API 804 retrieves the binary command from the database 806 corresponding to the reservation. At block 1214, the binary command is sent from the API 804 to the mobile application 120. At block 1216, the mobile application saves the binary command in memory 126. In some examples, the binary command may be saved in the local memory 111 of the HDT 102 processor. In some examples, the binary command is not saved in the mobile application memory 126 or the HDT 102 processor but passed from the server 802, through the mobile application 120, and used by the HDT 102 immediately, without being saved. In some examples, the binary command can be saved on the HDT 102, the mobile application 126 and the server 802. In some examples, the API 804 also sends a command to the mobile application 120 to only allow the binary command to be run during a reserved time period or set number of uses. In such examples, an operator may only emulate an RFID tag using the binary command during the reserved time period or number of uses, for security or other reasons.

When an operator is ready to emulate an RFID tag, for example when an operator needs to access a garage or door, at block 1218, the operator enters an emulate command into the mobile application 120. At block 1220, the mobile application 120 may retrieve the binary command from memory 126. At block 1222, the mobile application sends an emulate command to the HDT 102 via the Bluetooth interface 112 or USB 114. At block 1224, the HDT 102 emulates the RFID tag via running the received binary command.

Figure 13:
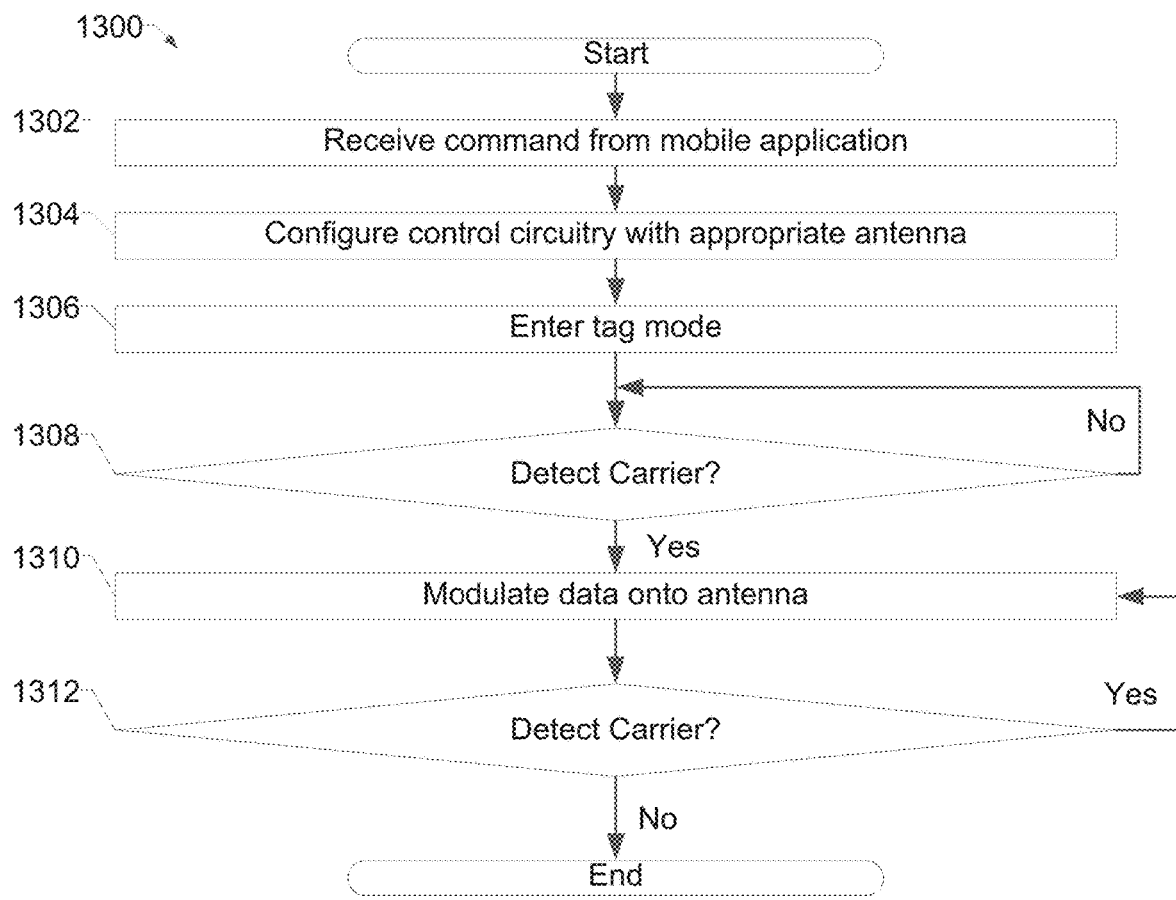
FIG. 13 is a flowchart representative of an example method of emulating a radio frequency identification tag using a handheld radio frequency identification reader and emulator.

FIG. 13 shows an example method 1300 that may be used to implement, the emulate process of block 1224 of method 1200 of FIG. 12.

At block 1302, the control circuitry 110 of the HDT 102 receives an emulate command from the mobile application 120 via the Bluetooth interface 112 or USB 114. The emulate command includes a binary command. The control circuitry 110 may include a processor and a field-programmable gate array ("FPGA"). In some examples, one FPGA may operate with both the HF circuitry 104 and LF circuitry 106, and only requires a configuration change to switch between working with the HF circuitry 104 and the LF circuitry 106. In some examples, the HF circuitry 104 and the LF circuitry 106 may be driven directly by the processor in the control circuitry 110 and the HF circuitry 104 and the LF circuitry 106. The UHF circuitry 108 may be driven directly by the processor and the UHF circuitry 108.

At block 1304, the control circuitry 110 is configured to work at the commanded frequency. For example, the processor may command the FPGA be configured work with the circuitry 104 or the LF circuitry 106. At block 1306, the control circuitry 110 enters into tag (i.e., emulate) mode, where the HDT 102 operates as an RFID tag which can be read by an RFID reader.

At block 1308, the control circuitry 110 waits to detect a carrier signal from an RFID reader. Once a carrier signal is detected, at block 1310, the control circuitry 110 modulates the data sent to the HDT 102 in the binary command. Modulation is accomplished by modulating the load on the antenna at the correct rate and level to transmit the tag data in the binary command to the RFID reader through backscatter modulation of the carrier signal transmitted from the RFID reader to the HDT 102. Upon successful reading of the tag information from the HDT 102, the RFID reader recognizes the emulated tag. When this occurs, for example access to a door or garage may be granted.

At block 1312, the control circuitry 110 continues to detect for a carrier signal. If a carrier signal is detected, the control circuitry 110 continues to modulate the data onto the antenna at block 1310. If a carrier is no longer detected (1312), the emulation process ends.

Returning to FIGS. 1-8, the system 100 which includes a universal RFID device such as the HDT 102 that may read various types of REED tags, upload tag information to a cloud database, and retrieve tag information stored in a database in order to emulate any RFID tag, may have myriad applications.

For example, in the hotel industry, a hotel may maintain a database with serial codes of RFID tags that provide access to hotel rooms, which may be hosted in the cloud infrastructure 124 of FIGS. 1 and 8. Each hotel room door may have a reader, and the hotel room door key may be a RFID tag. Rather than waiting to check in and check out, a hotel visitor may download a room access code via a mobile application and may then emulate the serial code to gain access to the hotel room via an HDT as described in this disclosure. In some examples, the hotel may change the access codes to limit the date and time when the serial code will provide access to the hotel room. In other examples, the mobile application may include code which only allows the emulator to emulate the tag within the allowed time period or number of uses.

Similarly, in home sharing, homeowners may provide access to keys, for example keys in a radio frequency lockboxes via granting a temporary access serial code or temporary access to the serial code to a renter. In some examples, the home may have an RFID unlocking door knob. The renter may then download the access serial code and unlock the lockbox or door knob via emulating an RFID tag having the access serial code with a mobile application and an HDT as described in this disclosure. The mobile application 120 may keep a record of when a serial code was used to unlock the lockbox or door, which may then be transmitted to and saved in a database 806 hosted in the cloud infrastructure 124, in order to record the renters who were within the home as well as when the renters accessed the home. Similarly, homeowners may grant access to a lockbox containing keys to a home to realtors or perspective buyers via granting a temporary access serial code or temporary access to the serial code to the realtor or perspective buyer. The realtor or perspective buyer may then access the keys in the lockbox via downloading the access serial code and emulating the serial code with an HUT and a mobile application. The mobile application 120 may keep a record of when a serial code was used to unlock the lockbox, which may then be transmitted to and saved in a database 806 hosted in the cloud infrastructure 124, in order to record the renters who were within the home as well as when the renters accessed the home.

Similarly in parking application, a parking garage or parking lot may allow temporary access to a driver by granting a temporary access serial code or granting temporary access to the serial code to the driver. The driver may download the access serial code and emulate the serial code with an HDT and a mobile application to gain access to the garage or lot.

Commercial and residential buildings, private clubs, and offices may similarly grant access to the building, club, or office to a visitor via granting a temporary access serial code or temporary access to the serial code to the visitor. Additionally, the building, club, or office might give all members a HDT to replace RFID tags for security and convenience. A visitor may download the access serial code and emulate the serial code with an HDT and a mobile application to gain access to the building, club, or office. Using such a system may allow buildings, clubs, and offices to allow access to visitors without requiring visitors to check in at front desks. The mobile application 120 may keep a record of when a serial code was used to access the building club, or office, which may then be transmitted to and saved in a database 806 hosted in the cloud infrastructure 124, in order to record the visitors who were within the building, club, or office as well as when the visitors accessed the building, club, or office. Such a system may also be used for food and/or package delivery services, as delivery persons may gain temporary access to a building, club, or office via emulating an RAID access serial code.

Disclosed universal RFID readers may also be used in inventory tracking. Inventory may be tagged with RFID tags. Manufacturers of different items in inventory may use various types of RFID tags, necessitating the use of multiple RFID readers. The described universal RFID device and system may read various RFID tags, thus eliminating the need for multiple RFID readers.

Disclosed universal RFID emulators may also be used to pay highway toll passes. Thus a user may pay for toll roads without a RFID toll device by emulating the RFID toll device with the universal RFID emulator. The universal RFID emulator may emulate any RFID toll device, thus eliminating the need for multiple toll devices.

Disclosed universal RFID emulators may also be used as a payment system. Credit cards may have RFID tags which are read by RFID readers to complete a transaction. A universal RFID emulator may emulate the RFID tag within a credit card to.

Figure 14A:
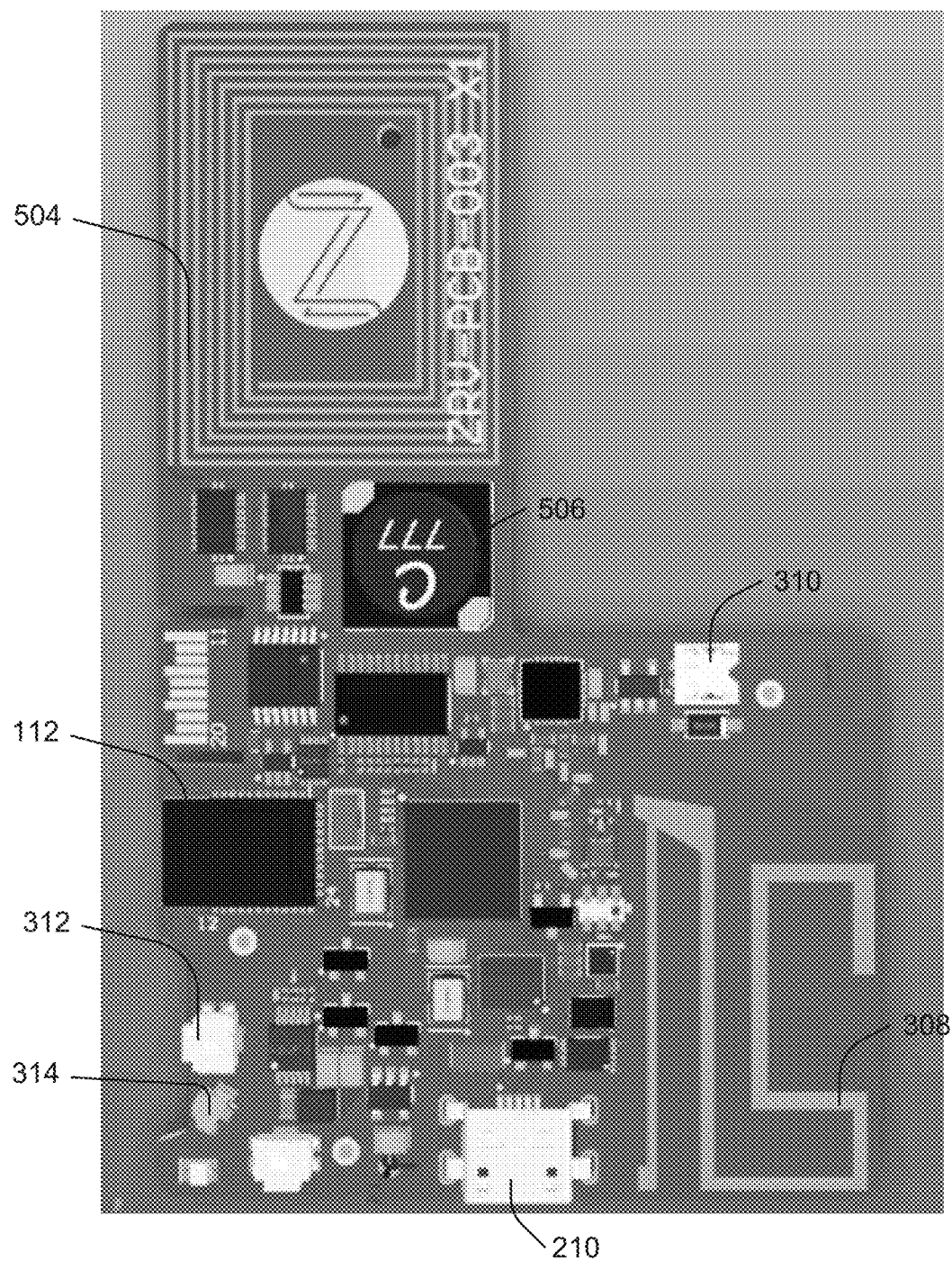
FIG. 14a is an illustration of an example circuit board which includes an LF antenna, and HF antenna, and a UHF antenna.

FIG. 14a illustrates an example circuit board 1400 which may be used in an HDT 102 to as an alternative to the antenna board 502 and the circuit board 302 as described with reference to FIGS. 3a, 3b, and 5. The circuit board 1400 includes an HF antenna 504, an LF antenna 506, a UHF antenna 308, a USB port 210, a battery connector 310, a Bluetooth interface 112, a switch 312 and an indicator light 314. The circuit board 1400 generally functions in the same way as the circuit board 302 and antenna board 502 as described with reference to FIGS. 3a, 3b, and 5, however the antennas (HF 504, LF 506, and UHF 308) are configured to fit onto the main circuit board 1400. For example, the LF antenna 506 of FIG. 14 may be a smaller antenna than the LF antenna 504 as depicted in FIG. 5. The UHF antenna 308 may also operate at frequencies ranging from 860 to 960 MHz.

Figure 14B:
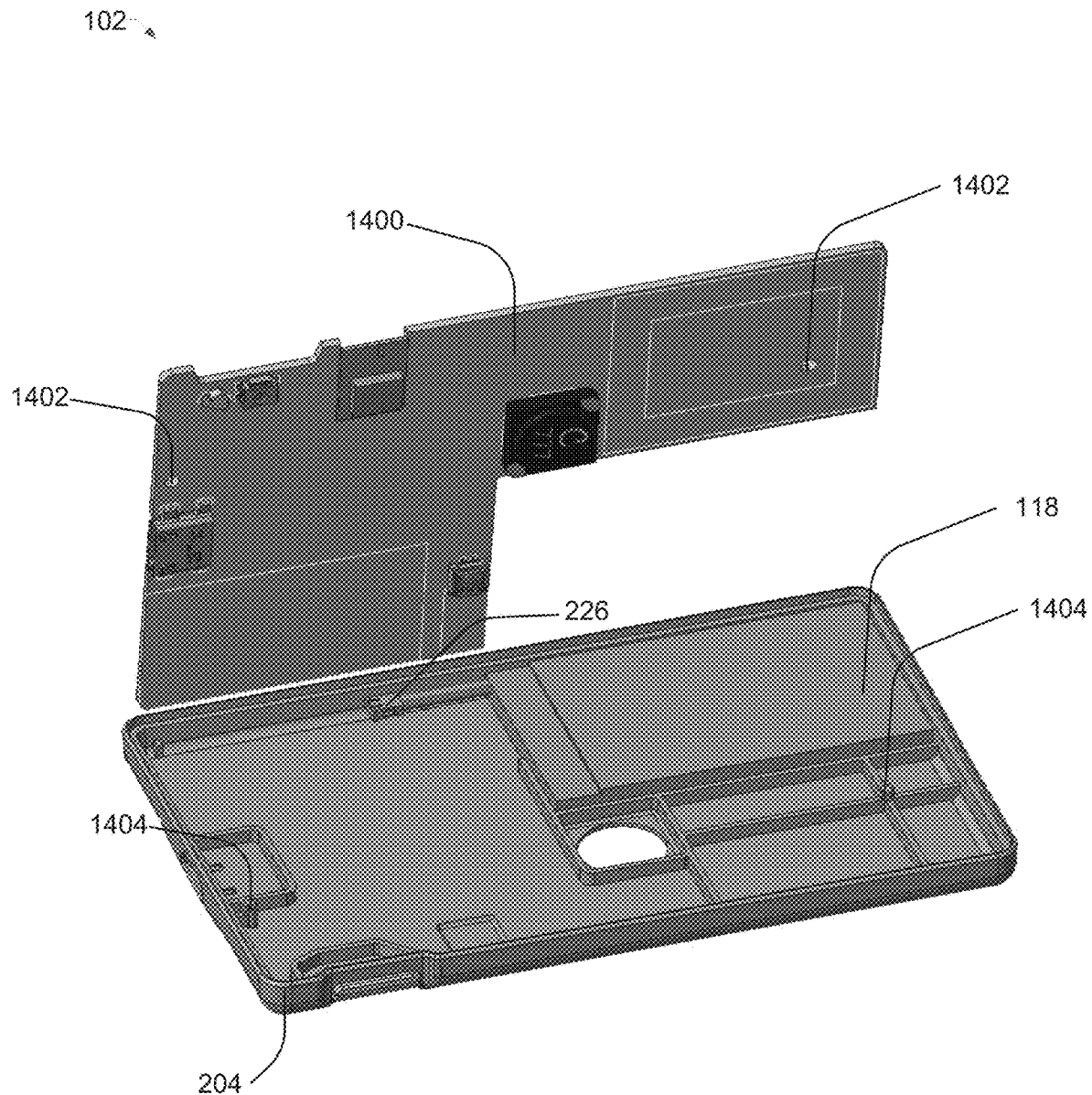
FIG. 14b is an illustration of an example view of a circuit board and battery within a casing of a handheld radio frequency identification reader and emulator.

FIG. 14b illustrates the circuit board 1400 and the front cover 204 of the HDT 102. A battery 118 is attached to the inside of the front cover 204, for example via an adhesive. The battery 118 is electrically connected to a battery connector 226, which connects to the circuit board 1400 via the battery connector 310 of the circuit board 1400. The circuit board 1400 includes apertures 1402 which receive ribs 1404 on the front cover 204 which hold the circuit board 1400 in place within the HDT 102. Including the antennas (HF 504, LF 506, and UHF 308) on the circuit board 1400 as described with reference to FIGS. 14a and 14b allows for the of the HDT 102 to physically thinner as compared to a HDT which includes a separate antenna board 502 and circuit board 302, as described with reference to FIGS. 3a, 3b, and 5.

As utilized herein the terms "circuits" and "circuitry" refer to physical electronic components, any analog and/or digital components, power and/or control elements, such as a microprocessor or digital signal processor (DSP), or the like, including discrete and/or integrated components, or portions and/or combination thereof (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

Control circuitry, as used herein, includes digital and analog circuitry, discrete or integrated circuitry, microprocessors, FPGAs, DSPs, etc., software, hardware and firmware, located on one or more boards, that form part or all of a controller.

As used, herein, the term "memory" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

As utilized herein, "and/or" means any one or more of the items in the list joined by "and/or". As an example, "x and/or y" means any element of the three-element set {(x), (y), (x, y)} other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The above-cited patents and patent publications are hereby incorporated by reference in their entirety. While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A universal RFID device comprising:
  radio frequency circuitry configured to:
    read a low frequency RFID tag;
    read a high frequency RFID tag;
    read an ultra-high frequency RFID tag;
    emulate a low frequency RFID tag;
    emulate a high frequency RFID tag; and
    emulate an ultra-high frequency RFID tag; and
  control circuitry configured to:
    receive a first command to read a first RFID tag;
    control the radio frequency to read the first RFID tag based on the first command;
    receive a second command to emulate a second RFID tag; and control the radio frequency to read the first RFID tag based on the first command.

2. The universal RFID device of claim 1, further comprising communication circuitry configured to communicate with a mobile application.

3. The universal RFID system of claim 2, wherein the universal RFID device and the mobile application communicate wirelessly.

4. The universal RFID device of claim 2, wherein the control circuitry is configured to receive the first command via the communication circuitry, and wherein the communication circuitry is further configured to transmit the information in the first RFID tag to the mobile application.

5. The universal RFID device of claim 2, wherein the control circuitry is configured to receive the second command via the communication circuitry, and wherein the radio frequency circuitry emulates the second RFID tag based on information included in the second RFID tag.

6. The universal RFID device of claim 2 further comprising a case containing the radio frequency circuitry, and wherein the case is configured to be handheld.

7. A universal RFID device comprising:
a low frequency antenna;
a high frequency antenna;
an ultra-high frequency antenna;
a battery; and
control circuitry configured to:
receive a read command from a mobile application to read a first RFID tag;
read information within the first RFID tag in response to receiving the read command; and
transmit, via a communication interface, the information within the first RFID tag to the mobile application; or
receive, via the communications interface, an emulate command from the mobile application to emulate a second RFID tag; and
emulate the second RFID tag in response to receiving the emulate command.

8. The universal RFID device of claim 7 further comprising a case containing the low-frequency antenna, the high-frequency antenna, the ultra-high frequency antenna, the battery, and the control circuitry, and wherein the case is configured to be handheld.

9. The universal RFID device of claim 7, further comprising an input port configured to receive input power to charge the battery.

10. The universal RFID device of claim 7, wherein the first RFID tag is at least one of a low-frequency RFID tag, a high-frequency RFID tag, or an ultra-high frequency RFID tag.

11. The universal RFID device of claim 7, wherein the second RFID tag is at least one of a low-frequency RFID tag, a high-frequency RFID tag, or an ultra-high frequency RFID tag.

12. The universal RFID system of claim 7, wherein the universal RFID device and the mobile application communicate wirelessly.

13. A universal RFID system comprising:
a server;
a mobile application configured to communicate with the server; and
a universal RFID device configured to:
communicate with the mobile application; and at least one of:
read at least two of low frequency RFID tags, high frequency RFID tags, or ultra-high frequency RFID tags; or
emulate at least two of low frequency RFID tags, high frequency RFID tags, or ultra-high frequency RFID tags; and
wherein the universal RFID device is configured to read a first RFID tag based on first command received from the mobile application and emulate a second RFID tag based on a second command received from the mobile application.

14. The universal RFID system of claim 13, wherein the universal RFID device and the mobile application communicate wirelessly.

15. The universal RFID system of claim 13, wherein the universal RFID device, the mobile application and the server, can create RFID tag information to be loaded by an access reader.

16. The universal RFID system of claim 13, wherein the universal RFID device is configured to:
receive, from the mobile application, a command to emulate an RFID tag, the command including tag type information and a serial number; and
emulate the RFID tag in response to receiving the command.

17. The universal RFID system of claim 16, wherein the mobile application is configured to:
receive, from an operator, a request to emulate an RFID tag; and
send the command to the universal RFID device to emulate the RFID tag in response to the request.

18. The universal RFID system of claim 17, wherein mobile application receives the tag type information and the serial number from the server.

19. The universal RFID system of claim 13, wherein the mobile application is configured to:
receive, from an operator, a first command to read an RFID tag;
download, in response to receiving the first command, code from the server to read an RFID tag;
send a second command to the universal RFID device to read the RFID tag, wherein information included in the second command is based on the code downloaded from the server;
receive, from the universal RFID device, a bit string representative of a serial number read from the RFID tag; and
decode the bit string to a serial number.

20. The universal RFID system of claim 19, wherein the mobile application is configured to transmit serial number to the server, and wherein the server is configured to store the serial number in the server.

* * * * *